US012592662B2

(12) United States Patent
Srinivasan et al.

(10) Patent No.: US 12,592,662 B2
(45) Date of Patent: Mar. 31, 2026

(54) ELECTRIC MACHINE DRIVE CALIBRATION, VERIFICATION, AND EFFICIENCY IMPROVEMENT

(71) Applicant: Tula eTechnology Inc., San Jose, CA (US)

(72) Inventors: Vijay Srinivasan, Farmington Hills, MI (US); Benjamin Matthew Wolk, Oakland, CA (US); Elliott A. Ortiz-Soto, San Jose, CA (US); Shahaboddin Owlia, Royal Oak, MI (US); Xiaoping Cai, San Jose, CA (US); Kai Wan, San Jose, CA (US)

(73) Assignee: Tula eTechnology Inc., San Jose, CA (US)

( * ) Notice: Subject to any disclaimer, the term of this patent is extended or adjusted under 35 U.S.C. 154(b) by 143 days.

(21) Appl. No.: 18/219,561

(22) Filed: Jul. 7, 2023

(65) Prior Publication Data

US 2024/0014762 A1     Jan. 11, 2024

Related U.S. Application Data

(60) Provisional application No. 63/359,529, filed on Jul. 8, 2022.

(51) Int. Cl.
H02P 21/22          (2016.01)
B60L 3/00           (2019.01)
          (Continued)

(52) U.S. Cl.
CPC .......... H02P 27/085 (2013.01); B60L 3/0061 (2013.01); B60L 53/22 (2019.02)

(58) Field of Classification Search
CPC ........ H02P 27/085; H02P 21/22; H02P 27/08; B60L 53/22; B60L 3/0061; F16H 61/0025
See application file for complete search history.

(56) References Cited

U.S. PATENT DOCUMENTS

| | | | |
|---|---|---|---|
| 4,441,043 | A | 4/1984 | Decesare |
| 4,989,146 | A | 1/1991 | Imajo |

(Continued)

FOREIGN PATENT DOCUMENTS

| | | |
|---|---|---|
| CN | 1829070 | 9/2006 |
| CN | 102381265 | 3/2012 |

(Continued)

OTHER PUBLICATIONS

Cai et al., "Torque Ripple Reduction for Switched Reluctance Motor with Optimized PWM Control Strategy", Energies, vol. 11, Oct. 15, 2018, pp. 1-27.

(Continued)

*Primary Examiner* — Cortez M Cook

(74) *Attorney, Agent, or Firm* — Brooks, Cameron & Huebsch, PLLC

(57)          ABSTRACT

Methods, systems, and devices for electric machine drive calibration, verification, and efficiency improvement are disclosed herein. One electric machine controller for calibration includes a processor and memory and instructions that are stored in the memory and executable by the processor to identify a vehicle and/or electric machine frequency response during operation of the vehicle and use the electronic machine and a dynamic motor drive converter to provide source excitations based on the identified frequency response.

18 Claims, 11 Drawing Sheets

(51) Int. Cl.
B60L 53/22 (2019.01)
H02P 27/08 (2006.01)

(56) References Cited

U.S. PATENT DOCUMENTS

| | | | |
|---|---|---|---|
| 5,099,410 A | 3/1992 | Divan | |
| 5,151,637 A | 9/1992 | Takada et al. | |
| 5,325,028 A | 6/1994 | Davis | |
| 5,483,141 A | 1/1996 | Uesugi | |
| 5,640,073 A | 6/1997 | Ikeda | |
| 5,701,062 A | 12/1997 | Barrett | |
| 5,731,669 A | 3/1998 | Shimizu | |
| 6,291,960 B1 | 9/2001 | Crombez | |
| 6,308,123 B1 | 10/2001 | Ikegaya et al. | |
| 6,370,049 B1 | 4/2002 | Heikkilae | |
| 6,424,799 B1 | 7/2002 | Gilmore | |
| 6,493,204 B1 | 12/2002 | Glidden et al. | |
| 6,605,912 B1 | 8/2003 | Bharadwaj et al. | |
| 6,829,515 B2 | 12/2004 | Grimm | |
| 6,829,556 B2 | 12/2004 | Kumar | |
| 6,906,485 B2 | 6/2005 | Hussein | |
| 6,940,239 B2 | 9/2005 | Iwanaga et al. | |
| 7,190,143 B2 | 3/2007 | Wei et al. | |
| 7,259,664 B1 | 8/2007 | Cho et al. | |
| 7,327,545 B2 | 2/2008 | Konishi | |
| 7,411,801 B2 | 8/2008 | Welchko et al. | |
| 7,453,174 B1 | 11/2008 | Kalsi | |
| 7,558,655 B2 | 7/2009 | Garg et al. | |
| 7,577,511 B1 | 8/2009 | Tripathi et al. | |
| 7,616,466 B2 | 11/2009 | Chakrabarti et al. | |
| 7,768,170 B2 | 8/2010 | Tatematsu et al. | |
| 7,852,029 B2 | 12/2010 | Kato et al. | |
| 7,960,888 B2 | 6/2011 | Ai et al. | |
| 7,969,341 B2 | 6/2011 | Robbe et al. | |
| 8,020,651 B2 | 9/2011 | Zillmer et al. | |
| 8,099,224 B2 | 1/2012 | Tripathi et al. | |
| 8,768,563 B2 | 7/2014 | Nitzberg et al. | |
| 8,773,063 B2 | 7/2014 | Nakata | |
| 9,046,559 B2 | 6/2015 | Lindsay et al. | |
| 9,050,894 B2 | 6/2015 | Banerjee et al. | |
| 9,308,822 B2 | 4/2016 | Matsuda | |
| 9,495,814 B2 | 11/2016 | Ramesh | |
| 9,512,794 B2 | 12/2016 | Serrano et al. | |
| 9,630,614 B1 | 4/2017 | Hill et al. | |
| 9,702,420 B2 | 7/2017 | Yoon | |
| 9,758,044 B2 | 9/2017 | Gale et al. | |
| 9,948,173 B1 | 4/2018 | Abu Qahouq | |
| 10,060,368 B2 | 8/2018 | Pirjaberi et al. | |
| 10,065,561 B1 | 9/2018 | Bastyr et al. | |
| 10,081,255 B2 | 9/2018 | Yamada et al. | |
| 10,256,680 B2 | 4/2019 | Hunstable | |
| 10,273,894 B2 | 4/2019 | Hunstable | |
| 10,291,168 B2 | 5/2019 | Fukuta | |
| 10,291,174 B2 | 5/2019 | Irie et al. | |
| 10,320,249 B2 | 6/2019 | Okamoto et al. | |
| 10,340,821 B2 | 7/2019 | Magee et al. | |
| 10,344,692 B2 | 7/2019 | Nagashima et al. | |
| 10,381,968 B2 | 8/2019 | Agirman | |
| 10,476,421 B1 | 11/2019 | Khalil et al. | |
| 10,550,776 B1 | 2/2020 | Leone et al. | |
| 10,742,155 B2 | 8/2020 | Tripathi | |
| 10,763,772 B1 | 9/2020 | Fatemi et al. | |
| 10,944,352 B2 | 3/2021 | Mazda et al. | |
| 11,077,759 B1 * | 8/2021 | Srinivasan | H02P 27/08 |
| 11,088,644 B1 | 8/2021 | Carvell | |
| 11,133,763 B1 | 9/2021 | Islam | |
| 11,133,767 B2 | 9/2021 | Serrano et al. | |
| 11,167,648 B1 | 11/2021 | Carvell et al. | |
| 11,228,272 B2 | 1/2022 | Tripathi | |
| 11,695,361 B2 | 7/2023 | Carvell et al. | |
| 2001/0039926 A1 | 11/2001 | Kobayashi et al. | |
| 2002/0043954 A1 | 4/2002 | Hallidy | |
| 2005/0127861 A1 | 6/2005 | Mcmillan et al. | |
| 2005/0151437 A1 | 7/2005 | Ramu | |
| 2005/0160771 A1 | 7/2005 | Hosoito et al. | |

| | | | |
|---|---|---|---|
| 2007/0216345 A1 | 9/2007 | Kanamori | |
| 2007/0287594 A1 | 12/2007 | Degeorge et al. | |
| 2008/0129243 A1 | 6/2008 | Nashiki | |
| 2008/0179980 A1 | 7/2008 | Dawsey et al. | |
| 2009/0045691 A1 | 2/2009 | Ichiyama | |
| 2009/0121669 A1 | 5/2009 | Hanada | |
| 2009/0128072 A1 | 5/2009 | Strong et al. | |
| 2009/0146615 A1 | 6/2009 | Zillmer et al. | |
| 2009/0179608 A1 | 7/2009 | Welchko et al. | |
| 2009/0306841 A1 | 12/2009 | Welchko et al. | |
| 2010/0010724 A1 | 1/2010 | Tripathi et al. | |
| 2010/0201294 A1 | 8/2010 | Yuuki et al. | |
| 2010/0228434 A1 | 9/2010 | Leyerle | |
| 2010/0296671 A1 | 11/2010 | Khoury et al. | |
| 2011/0029179 A1 | 2/2011 | Miyazaki et al. | |
| 2011/0089774 A1 | 4/2011 | Kramer | |
| 2011/0101812 A1 | 5/2011 | Finkle et al. | |
| 2011/0130916 A1 | 6/2011 | Mayer | |
| 2011/0208405 A1 | 8/2011 | Tripathi et al. | |
| 2012/0056569 A1 | 3/2012 | Takamatsu et al. | |
| 2012/0112674 A1 | 5/2012 | Schulz et al. | |
| 2012/0169263 A1 | 7/2012 | Gallegos-Lopez et al. | |
| 2012/0217921 A1 | 8/2012 | Wu et al. | |
| 2013/0134912 A1 | 5/2013 | Khalil et al. | |
| 2013/0141027 A1 | 6/2013 | Nakata | |
| 2013/0226420 A1 | 8/2013 | Pedlar et al. | |
| 2013/0241445 A1 | 9/2013 | Tang | |
| 2013/0258734 A1 | 10/2013 | Nakano et al. | |
| 2014/0018988 A1 | 1/2014 | Kitano et al. | |
| 2014/0028225 A1 | 1/2014 | Takamatsu et al. | |
| 2014/0130506 A1 | 5/2014 | Gale et al. | |
| 2014/0176034 A1 | 6/2014 | Matsumura et al. | |
| 2014/0217940 A1 | 8/2014 | Kawamura | |
| 2014/0265957 A1 | 9/2014 | Hu et al. | |
| 2014/0292382 A1 | 10/2014 | Ogawa et al. | |
| 2014/0354199 A1 | 12/2014 | Zeng et al. | |
| 2015/0025725 A1 | 1/2015 | Uchida | |
| 2015/0025739 A1 * | 1/2015 | Wakairo | F16H 61/0025 701/36 |
| 2015/0240404 A1 | 8/2015 | Kim et al. | |
| 2015/0246685 A1 | 9/2015 | Dixon et al. | |
| 2015/0261422 A1 | 9/2015 | Den et al. | |
| 2015/0297824 A1 | 10/2015 | Cabiri et al. | |
| 2015/0318803 A1 | 11/2015 | Wu et al. | |
| 2016/0114830 A1 | 4/2016 | Dixon et al. | |
| 2016/0201586 A1 | 7/2016 | Serrano et al. | |
| 2016/0226409 A1 | 8/2016 | Ogawa | |
| 2016/0233812 A1 | 8/2016 | Lee et al. | |
| 2016/0269225 A1 | 9/2016 | Kirchmeier et al. | |
| 2016/0373047 A1 | 12/2016 | Loken et al. | |
| 2017/0087990 A1 | 3/2017 | Neti et al. | |
| 2017/0163108 A1 | 6/2017 | Schencke et al. | |
| 2017/0331402 A1 | 11/2017 | Smith et al. | |
| 2018/0032047 A1 | 2/2018 | Nishizono et al. | |
| 2018/0045771 A1 | 2/2018 | Kim et al. | |
| 2018/0154786 A1 | 6/2018 | Wang et al. | |
| 2018/0230919 A1 | 8/2018 | Nagashima et al. | |
| 2018/0276913 A1 | 9/2018 | Garcia et al. | |
| 2018/0323665 A1 | 11/2018 | Chen et al. | |
| 2018/0334038 A1 | 11/2018 | Zhao et al. | |
| 2019/0058374 A1 | 2/2019 | Enomoto et al. | |
| 2019/0288629 A1 | 9/2019 | Tripathi | |
| 2019/0288631 A1 | 9/2019 | Tripathi | |
| 2019/0341820 A1 | 11/2019 | Krizan et al. | |
| 2020/0212834 A1 | 7/2020 | Mazda et al. | |
| 2020/0262398 A1 | 8/2020 | Sato et al. | |
| 2020/0328714 A1 | 10/2020 | Tripathi | |
| 2020/0343848 A1 * | 10/2020 | Lee | H02P 21/22 |
| 2020/0343849 A1 | 10/2020 | Coroban-Schramel | |
| 2020/0366223 A1 | 11/2020 | Coroban-Schramel | |
| 2021/0146909 A1 | 5/2021 | Serrano et al. | |
| 2021/0203263 A1 | 7/2021 | Serrano et al. | |
| 2021/0351733 A1 | 11/2021 | Carvell | |
| 2023/0223885 A1 | 7/2023 | Tripathi | |

FOREIGN PATENT DOCUMENTS

| | | |
|---|---|---|
| CN | 104716754 | 6/2015 |
| CN | 204589885 | 8/2015 |

(56) References Cited

FOREIGN PATENT DOCUMENTS

| CN | 105196877 | 12/2015 |
|----|-----------|---------|
| CN | 205229379 | 5/2016 |
| CN | 106932208 | 7/2017 |
| CN | 107067780 | 8/2017 |
| CN | 207129052 | 3/2018 |
| CN | 108216026 | 6/2018 |
| CN | 108445386 | 8/2018 |
| CN | 110212725 | 9/2019 |
| DE | 102014206342 | 10/2015 |
| EP | 2605398 | 6/2013 |
| ES | 2816386 | 4/2021 |
| FR | 2989479 | 10/2013 |
| GB | 2273212 | 6/1994 |
| JP | 10-243680 | 9/1998 |
| JP | 2008-079686 | 4/2008 |
| JP | 2009-065758 | 3/2009 |
| JP | 2011067043 | 3/2011 |
| JP | 2014-033449 | 2/2014 |
| JP | 2017-011970 | 1/2017 |
| JP | 2017-200382 | 11/2017 |
| JP | 2018-033250 | 3/2018 |
| KR | 10-2010-0021146 | 2/2010 |
| KR | 10-2017-0021146 | 2/2017 |
| KR | 10-2017-0032976 | 3/2017 |
| WO | 03/36787 | 5/2003 |
| WO | 2012-010993 | 1/2012 |

OTHER PUBLICATIONS

Carvell et al, U.S. Appl. No. 17/204,269, filed Mar. 17, 2021.
Carvell, U.S. Appl. No. 16/866,917, filed May 5, 2020.
Carvell, U.S. Appl. No. 17/188,189, filed Mar. 1, 2021.
Islam, U.S. Appl. No. 17/220,228, filed Apr. 1, 2021.

Luckjiff et al., "Hexagonal$Sigma Delta$Modulators in Power Electronics", IEEE Transactions on Power Electronics, vol. 20, No. 5, Sep. 2005, pp. 1075-1083.
Mirzaeva et al., "The use of Feedback Quantizer PWM for Shaping Inverter Noise Spectrum", Power Electronics and Motion Control Conference (EPE/PEMC), 2012 15th International IEEE, Sep. 4, 2012, pp. DS3c. 10-1, XP032311951, DOI: 10.1109/EPEPEMC. 2012.6397346, ISBN: 978-1-4673-1970.6.
Ramsey, "How this father and son's new electric turbine could revolutionize electric cars; The Hunstable Electric Turbine can produce up to three times the torque of any other motor", Available Online at <https://www.autoblog.com/2020/03/08/hunstable-electric-turbine/>, Mar. 8, 2020, 9 pages.
Serrano et al, U.S. Appl. No. 16/689,450, filed Nov. 20, 2019.
Spong et al., "Feedback Linearizing Control of Switched Reluctance Motors", IEEE Transactions on Automatic Control, vol. AC-32, No. 5, May 1987, pp. 371-379.
Srinivasan, U.S. Appl. No. 17/158,230, filed Jan. 26, 2021.
Srinivasan, U.S. Appl. No. 17/188,509, filed Mar. 1, 2021.
Tripathi, U.S. Appl. No. 16/353, 159, filed Mar. 14, 2019.
Tripathi, U.S. Appl. No. 16/912,313, filed Jun. 25, 2020.
Tripathi, U.S. Appl. No. 16/353,166, filed Mar. 14, 2019.
Islam, U.S. Appl. No. 18/165,100, filed Feb. 6, 2023.
Farah et al., U.S. Appl. No. 18/184,569, filed Mar. 15, 2023.
Phillips, U.S. Appl. No. 18/305,776, filed Apr. 24, 2023.
Phillips, U.S. Appl. No. 18/348,255, filed Jul. 6, 2023.
Carvell et al., U.S. Appl. No. 18/362,602, filed Jul. 31, 2023.
Parsels et al., U.S. Appl. No. 18/452,363, filed Aug. 18, 2023.
Islam et al., U.S. Appl. No. 18/452,050, filed Aug. 18, 2023.
Islam et al., U.S. Appl. No. 18/452,260, filed Aug. 18, 2023.
International Search Report and Written Opinion from related PCT Application No. PCT/US2023/027157, dated Nov. 21, 2023, 12 pages.

* cited by examiner 551   552   SAMPLE EQUIVALENT CIRCUIT PARAMETERS   553

| SOC | $V_{OC}$ | $R_0$ | $R_1$ | $R_2$ | $R_3$ | $R_4$ | $C_1$ | $C_2$ | $C_3$ | $C_4$ |
|---|---|---|---|---|---|---|---|---|---|---|
| % | V | $m\Omega$ | $m\Omega$ | $m\Omega$ | $m\Omega$ | $m\Omega$ | F | F | F | F |
| 100 | 4.16 | 36.9 | 9.1 | 10.6 | 12.9 | 20.4 | 192 | 1461 | 4704 | 19697 |
| 90 | 4.08 | 37.7 | 8.7 | 9.2 | 17.6 | 7.8 | 296 | 3083 | 5728 | 124191 |
| 80 | 4.01 | 36.7 | 5.1 | 14.1 | 18.5 | 16.7 | 635 | 2230 | 5188 | 99536 |
| 70 | 3.91 | 35.7 | 7.2 | 18.5 | 34.9 | 18.8 | 589 | 2511 | 4613 | 94500 |
| 60 | 3.82 | 35.0 | 10.8 | 22.2 | 24.4 | 61.7 | 421 | 2146 | 12035 | 31424 |
| 50 | 3.71 | 34.5 | 6.5 | 12.3 | 14.8 | 12.3 | 464 | 2803 | 8544 | 125267 |
| 40 | 3.64 | 35.5 | 5.7 | 11.8 | 23.9 | 21.1 | 615 | 3443 | 7778 | 75464 |
| 30 | 3.57 | 36.4 | 6.2 | 12.6 | 22.4 | 6.0 | 612 | 3207 | 8853 | 410486 |
| 20 | 3.46 | 36.4 | 7.8 | 16.1 | 17.1 | 25.6 | 506 | 2402 | 9581 | 133384 |
| 10 | 3.33 | 36.9 | 6.4 | 20.1 | 50.9 | 129.8 | 716 | 2283 | 5042 | 29345 |
| 5 | 3.14 | 39.1 | 27.9 | 19.6 | 139.3 | 409.6 | 60 | 1771 | 1344 | 5430 |
| 0 | 2.94 | 44.8 | 7.1 | 181.9 | 0.1 | 1389.5 | 250 | 231 | 2089984 | 1650 |

FIG. 5

FIGURE 2: DEFINITION OF PULSE-WIDTH MODULATED SQUARE WAVEFORM.

PULSED RESISTANCE AS A FUNCTION OF PWM DUTY CYCLE.

POWER LOSS FROM A PULSED CURRENT AT MEAN C-RATE AND PULSE
DUTY CYCLE.

DIRECT COMPARISON OF DMD AND CONTINUOUS:

ELECTRIC MACHINE DRIVE CALIBRATION, VERIFICATION, AND EFFICIENCY IMPROVEMENT

PRIORITY INFORMATION

This application claims the benefit of U.S. Provisional Application No. 63/359,529, filed on Jul. 8, 2022, then contents of which are incorporated herein by reference.

TECHNICAL FIELD

The present disclosure relates to electric machine management methods, devices, and systems and, in particular, to electric machine drive calibration, verification, and efficiency improvement.

BACKGROUND

The phrase "electric machine" as used herein is intended to be broadly construed to include machines that operate as either or both electric motors and generators. When an electric machine is operating as a motor, it converts electrical energy into mechanical energy. When operating as a generator, the electric machine converts mechanical energy into electrical energy.

Electric motors and generators are used in a wide variety of applications and under a wide variety of operating conditions. In general, many modern electric machines have relatively high energy conversion efficiencies. However, the energy conversion efficiency of most electric machines can vary considerably based on their operational load. Many applications require that the electric machine operate under a wide variety of different operating load conditions, which means that the electric machine when operating in a continuous manner often does not operate as efficiently as it is capable of.

For example, for any given motor speed, the motor's efficiency tends to drop off somewhat when the motor's load is higher or lower than the most efficient load. In some performance areas, the motor's efficiency tends to drop relatively quickly.

If the operating conditions could be controlled so that the motor is almost always operated at or near its most efficient point, the energy conversion efficiency of the motor would be quite good. It has been proposed that the electric machine be pulsed during operation to achieve a condition where it is operating in its most efficient point more often.

When controlling a machine in pulsed operation, measurement or estimation of the torque output must be determined over a period of time. One type of pulsed electric machine management is referred to as dynamic motor drive (DMD).

A conventional method to determine this torque output is to evaluate measured or estimated torque as a function of time, for example, by averaging or using a digital filter of recent estimates or measurements of torque. When attempting to use these methods for an electric machine using pulsed operation, for example in a DMD process, this can lead to inaccurate torque values as these methods can render inconsistent results.

With regard to calibrating such electric machines, there is wide variation in noise, vibration, and harshness (NVH) response among different vehicles utilizing electric machines. Manually calibrating each vehicle model to reduce or minimize NVH is very labor intensive and may dissuade potential vehicle manufacturers from adopting DMD on their platforms. The proposed solution will add automatic calibration and adaptation capabilities to the DMD system.

Current techniques require manual calibration of the DMD frequency selection for different speeds and loads of the motor. The process requires extensive testing on individual models and needs to be repeated for every model from each potential vehicle manufacturer.

Further, in a battery-powered application, such as an electric vehicle, the performance of the battery is also important to ensure overall optimal efficiency and battery life which can extend the range of the vehicle. It has been found under certain pulsing conditions, power losses at the battery can be significant. Pulsed currents have been found experimentally to incur power losses under certain conditions. The power loss relates to a reduction in terminal voltage during the on-phase of the pulse due to higher resistive losses proportional to $I^2 R$, where I is the current and R is the internal resistance of the battery. Mitigating these losses is important to maximizing DMD gain.

Additionally, extensive pre-calibration is required to ensure DMD operates optimally across all possible scenarios, taking into account speed, torque, machine temperature, battery state of charge (SOC), battery temperature, battery state of health (SOH), etc. Some possible scenarios may not be adequately considered such that DMD operation increases, rather than decreases, power loss compared to continuous operation in those scenarios.

BRIEF DESCRIPTION OF THE DRAWINGS

FIG. 5 is an example of sample ECM model parameters that may be used with embodiments of the present disclosure.

DETAILED DESCRIPTION

Figure 1:
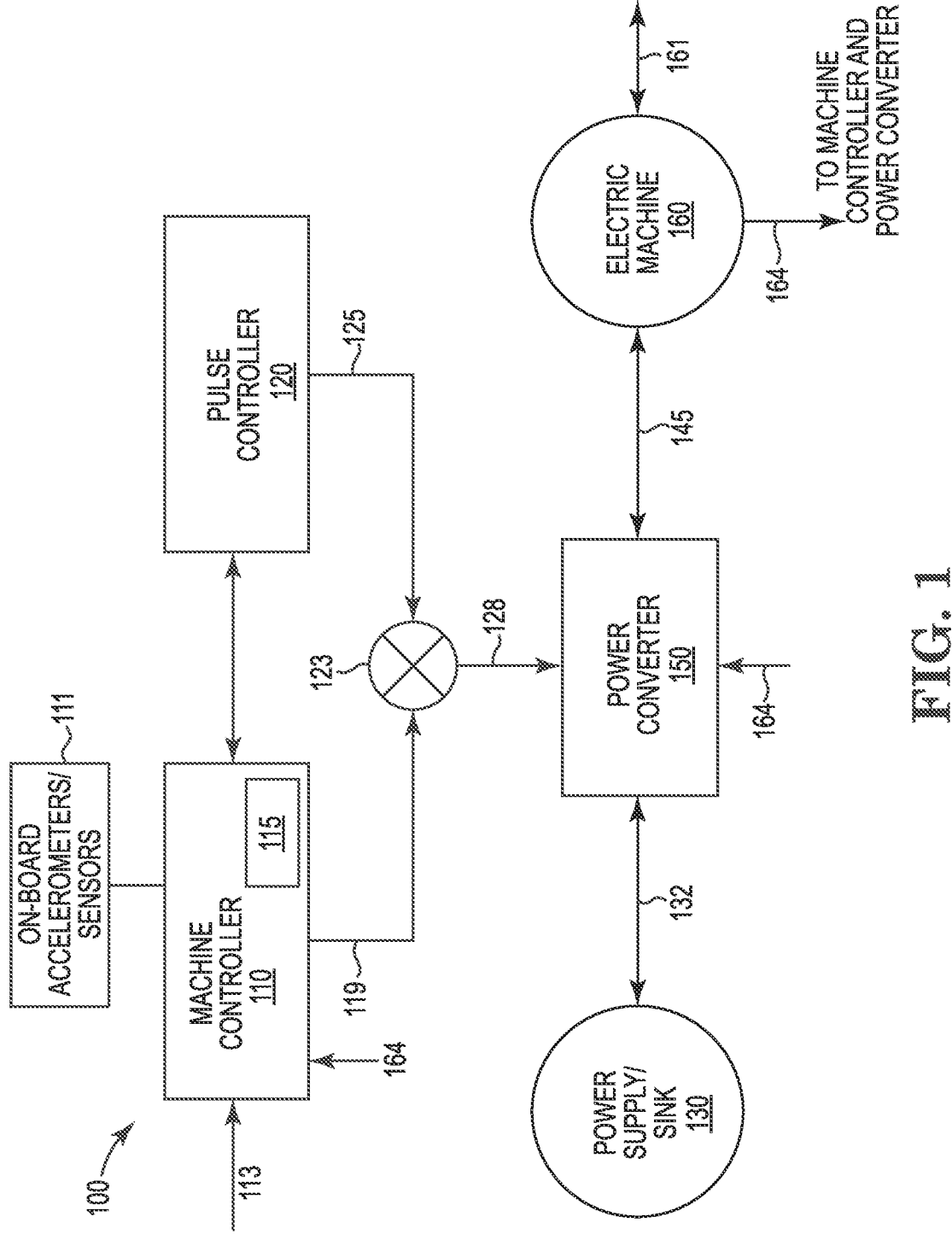
FIG. 1 is a functional block diagram that diagrammatically illustrates an electric machine control architecture in accordance with embodiments of the present disclosure.

The present disclosure provides better ways to utilize pulsed electric machine management by electric machine drive calibration, verification, and efficiency improvement. This can be accomplished by implementing a new electric machine pulsed control methodology.

Historical practices for electrical machine control have been developed for operation of motors subject to continuously variable torque control. For example, when electric machines are operated under a continuous power application scheme, if 100 Newton meters (Nm) of torque is desired to be delivered, the control system controlling the electric machine delivers 100 Nm of electro-motive torque. However, in some implementations, advantages can be found to deliver larger amounts of torque over shorter time periods (pulsing torque delivery intermittently). This pulsing operation can be more efficient, and therefore, more desirable. Such techniques are often referred to as dynamic motor drive (DMD)

In such situations, if the desired torque output is 100 Nm of torque over a period of time and, if the most efficient torque production for the particular electric machine being used is at 200 Nm, the control system will deliver 200 Nm of torque during 50% of that time period, providing the same aggregate 100 Nm over the time period, but doing so more efficiently than if a steady 100 Nm were provided for the entire time period. The 200 Nm torque deliveries can be delivered in pulses that are spaced out over time. For example, a time period can have twenty segments, where ten of the segments are at 200 Nm and ten of the segments are at 0 Nm (e.g., alternating 200 Nm, 0 Nm, 200 Nm, 0 Nm, . . . ). Other implementation schedules are possible for various other electric machines and may provide more desirable operation, providing, for example, more effective vibration control which is an important factor for NVH refinement.

This pulsing technique relates generally to pulsed control of electric machines (e.g., electric motors and generators) that would otherwise be operated in a continuous manner. Such a pulsed technique can improve the energy conversion efficiency of the electric machine when operating conditions warrant. More specifically, under selected operating conditions, an electric machine is intermittently driven (pulsed) at more efficient energy conversion operating levels to deliver a desired average torque more energy efficiently than would be attained by traditional continuous motor control.

The pulses can be adjusted based on pulse width modulation (changing the duration that an electric machine is in an on-state) or pulse density modulation (the number of pulses in a particular time period). The pulses can be adjusted in these ways based on the demands for torque output and performance and efficiency considerations.

Some goals of such pulsing techniques are to produce accurate and responsive delivery of torque, but the torque control must also be achievable. For example, having the torque delivered in such a manner that the torque delivery is making the electric machine operate in performance areas that it is not designed to operate, would be an instance where the torque is out of control, as this could result in a safety or equipment damage issue, among other concerns.

Many types of electrical machines are traditionally driven by a continuous, albeit potentially varying, drive current when the machine is used as a motor to deliver a desired torque output. The drive current is frequently managed by controlling the output voltage of a power converter (e.g., an inverter) which serves as the voltage input to the motor. Conversely, the power output of many types of generators is managed by controlling the strength of a magnetic field, which may, for example, be accomplished by controlling an excitation current supplied to rotor coils by an exciter.

With pulsed control, the output of the machine is intelligently and intermittently modulated between "torque on" and "low torque" states in a manner that: (1) meets operational demands, while (2) improving overall efficiency. Stated differently, under selected operating conditions, the electric machine is intermittently driven at a more efficient energy conversion operating level (the "torque on" state) to deliver a desired output.

In the periods between the pulses, the machine ideally does not generate or consume any torque (the "low (e.g., zero) torque" state). This can conceptually be thought of as turning the electric machine "off."

In some implementations, this can be accomplished by effectively turning the electric machine "off," as for example, by shutting off drive current to a motor or the excitation current for a generator. However, in other implementations, the electric machine may be controlled during the "low torque" state in a manner that attempts to cause the torque generated by the electric machine to be zero or as close to zero as may be practical or appropriate for the particular machine.

In particular, for motors in which the magnetic field is induced in the rotor through electromagnetic fields in the stator, ('AC induction motors'), the time constant of field generation may necessitate keeping some level of continuous 'field' current in the electric motor. In some implementations, any power converters used in conjunction with the electric machine may effectively be turned off for at least portions of the "low torque" periods as well.

Control (e.g., feedback, feedforward, etc.) of electric machines is based on a continuous or effectively continuous control strategy. That is, at every moment during use of the electric machine, its control system is utilizing a control strategy to determine whether the electric machine is actuated or not.

In some embodiments, the electric machine is driven in a pulsed manner when a desired output is less than a designated output level for a given motor speed and driven in a continuous manner when the desired motor output is greater than or equal to the designated output level.

In some embodiments, a power converter is used to control the output of the electric machine. Depending on the application, the power converter may take the form of an inverter, a rectifier, or other appropriate power converter.

The frequency of the pulsing may vary widely with the requirements of any particular application. By way of examples, in various embodiments the electric machine alternates between the first and second output levels at least 10, 100, or 1000 times per second.

Some embodiments discussed herein provide automatic calibration of a DMD application for NVH. Such embodiments can be used to automatically calibrate the pulsing frequency for different speeds and loads based on in-situ measurement of NVH response, for example, using only production sensors and actuators already associated with the electric machine in a vehicle, thereby requiring no additional components. For example, in one method, Step 1: Use the e-machine inverter in an electric vehicle (or other application) as an excitation source to measure the vehicle's NVH response and identify resonances and high response regions.

Step 2: Use the measured response curve to automatically adjust DMD calibrations to maintain acceptable NVH in all operating conditions.

Step 3 (optional): Fine tune auto-calibrations based on operational response. In this manner, autocalibration can be accomplished in the vehicle while in use.

Further, as discussed above, it has been found under certain pulsing conditions, power losses at the battery can be significant, but these can be minimized by appropriate selection of torque/current modulation parameters. Various embodiments of the present disclosure utilize an equivalent circuit model (ECM) fitted to experimental data, the approximate losses can be characterized analytically. These can be integrated into an offline or online optimization to select the DMD calibration parameters that will maximize system efficiency gains. In addition to the battery, other components in the high-voltage distribution system and ancillaries could be included in the ECM.

Additionally, a real-time, on-board diagnostic monitor as discussed in regarding various embodiments of the present disclosure, can help prevent the situation where DMD negatively impacts energy consumption.

In such embodiments, the performance of DMD is monitored in-situ (on the vehicle) to ensure that DMD is performing to expectation. One approach discussed with respect to the embodiments of the present disclosure is to turn DMD on and off during a relatively steady torque/speed period and compare the battery output power/current between DMD and continuous mode (less the DCDC converter input power/current for 12V accessories) to ensure the DMD gain meets a pre-calibrated expectation within some threshold.

Correction factors for torque and speed variations for the "steady period" can be applied to normalize the measured power/current to a reference torque/speed. The inverter input power could also be used (instead of the battery power/current) with two potential drawbacks: (1) excess losses in the battery will not be captured, (2) the sampling rates of the inverter internal components may not be fast enough to resolve DMD pulses for energy integration.

Separately from the on/off toggle approach, in another embodiment, standalone DMD power consumption can be monitored and compared to the expected power consumption/current from pre-calibrated maps. This approach would likely be used during a relatively steady torque/speed period but could be completed faster since only the DMD mode is required (i.e., the transition to continuous mode and sampling during continuous mode are not needed).

If the DMD gain over continuous mode and/or the DMD power consumption meet expectation, then no additional action needs to be taken. However, if DMD is underperforming versus continuous mode or the DMD power consumption is higher than expectation, this can trigger certain actions. Some example actions are: to stop using DMD in the speed/torque window tested, throw an error, or alter the DMD "on" torque. In some embodiments, if DMD is prohibited in some area of operation, a future retest of that area that shows the expected DMD behavior can re-enable DMD there.

Such a monitoring type algorithm is probably most useful for trimming the top of the DMD operating map (high torque/duty cycle), but steady torque conditions may not be encountered there often (lower "cruising" torques are more likely to be steady). However, the "DMD only" monitoring approach may be more applicable for higher torques that are only steady for short periods.

Various embodiments of the present disclosure can, therefore, capture underperformance of DMD at any encountered condition without specifically knowing the root cause of the issue and can take mitigating action to prevent the underperformance from increasing vehicle energy consumption while the electric machine is in operation.

Machine controllers and electric machine systems are described for implementing all of the functionalities described above. In various embodiments, the system may be configured to operate as a motor, a generator, or as a motor/generator.

In various embodiments, the electric machine may be: an induction machine; a switched reluctance electric machine; a synchronous AC electric machine; a synchronous reluctance machine; a switched reluctance machine; a permanent magnet synchronous reluctance machine; a hybrid permanent magnet synchronous reluctance machine; an externally excited AC synchronous machine; a permanent magnet synchronous machine; a brushless DC electric machine; an electrically excited DC electric machine; a permanent magnet DC electric machine; a series wound DC electric machine; a shunt DC electric machine; a brushed DC electric machine; a compound DC electric machine; an eddy current machine; an AC linear machine; an AC or DC mechanically commutated machine; or an axial flux machine.

In the following detailed description, reference is made to the accompanying drawings that form a part hereof. The drawings show, by way of illustration, how one or more embodiments of the present disclosure may be practiced.

These embodiments are described in sufficient detail to enable those of ordinary skill in the art to practice one or more embodiments of the present disclosure. It is to be understood that other embodiments may be utilized and that process, computerized, and/or structural changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure and should not be taken in a limiting sense.

The figures herein follow a numbering convention in which the first digit or digits correspond to the drawing figure number and the remaining digits identify an element or component in the drawing.

As used herein, "a" or "a number of" something can refer to one or more such things. For example, "a number of valves" can refer to one or more valves. As used herein, "a plurality of" means two or more things.

FIG. 1 is a functional block diagram that diagrammatically illustrates an electric machine control architecture in accordance with embodiments of the present disclosure. There are a wide variety of different electric machines and each machine has its own unique efficiency characteristics. Therefore, the operating regions in which pulsed control can provide efficiency gains will vary significantly based on factors including the particular electric machine's characteristics and the current operational rotor speed.

In many applications of electric machines, power converters (e.g., inverters) will typically be used to convert power to or from the source to the voltage, current, and waveforms required by the electric machine. For example, inverters are used to convert power received from a DC power supply, such as a battery or capacitor, into the appropriate AC input power applied to a motor.

The energy conversion efficiency of power converters will also typically vary over the operating range of the converter. Thus, when optimizing control of a motor that is part of an inverter/electric motor combination, it is desirable to consider the energy conversion efficiency of the overall inverter/ electric motor system as opposed to the energy conversion efficiency of the motor alone. Preferably, the pulsed control of an electric machine will be modeled to account for the efficiencies of any/all of the components that influence the energy conversion during pulsing. For example, when power for an electric motor is drawn from a battery, the battery's power delivery efficiency, cabling losses between components, and any other loss factors can be considered in addition to the inverter and motor efficiencies, when determining the motor drive signal that delivers the best energy conversion efficiency.

In general, the overall energy conversion efficiency of a power converter/electric machine system is a function of the product of the converter conversion efficiency times the electric machine conversion efficiency times the delivery efficiency of other components. Thus, it should be appreciated that the parameters of the pulsed drive signal that has the maximum system energy conversion efficiency may be different than the parameters that would provide the best energy conversion efficiency for the motor itself.

FIG. 1 illustrates a control architecture suitable for controlling an electric machine in the described manner. In this embodiment, the system 100 includes a machine controller 110, a number of connected components 111 (e.g., in a vehicle, the connected components can be sensors such as microphones and accelerometers that provide data to the machine controller), a pulse controller (pulse generator) 120, a power supply/sink 130, a power controller/converter 150, and an electric machine 160.

The pulse controller 120 is responsible for controlling/ directing the timing of the pulsing of electric machine 160 when pulsed operation is called for. In the embodiment illustrated in FIG. 1, the pulse controller is shown as a component that is separate from the machine controller 110 to facilitate explanation of its function. However, in various embodiments, the pulse controller may be implemented as part of the machine controller 110, as a separate component, as part of power controller/converter 150, or in other appropriate forms.

When the electric machine 160 operated is a motor, the machine controller functions as a motor controller, and the power controller/converter 150 is responsible for converting power 132 received from power supply 130 to a form that is suitable for driving the motor 160. In embodiments in which the power supply/sink can supply or receive power directly in the form required by or outputted by the electric machine, the power controller 150 can conceptually take the form of a switch or logical multiplier that simply turns the motor on and off to facilitate the desired pulsing.

The power supply/sink 130 can take any suitable form. In some implementations, the power supply/sink may take the form of a battery or a capacitor. In other implementations, the source may be a power grid (e.g., "wall power"), a photovoltaic system, or any other available source. Similarly, the sink may be an electrical load (such as an electrically operated machine or appliance, a building, a factory, a home, etc.), a power grid, or any other system that uses or stores electrical power.

The power controller/converter 150 can also take a wide variety of different forms. When the power supply/sink 130 is a DC power supply and the electric machine 160 is an AC motor, the power controller/converter 150 can take the form of an inverter. Conversely, when the power supply/sink 130 is a DC power sink and the electric machine 160 is an AC generator, the power controller/converter 150 can take the form of a rectifier. When both the power supply/sink 130 and the electric machine are AC components, the power controller/converter 150 may include a bidirectional or 4 quadrant power converter.

In FIG. 1, the requested output is labeled 113, the torque delivered or received by the electric machine is labeled 161 and the motor/generator speed is labeled 164. In some embodiments, the machine controller 110 includes a data structure 115 (as, for example, a lookup table) that serves as a pulsed operation map that defines the operating region in which pulsed motor control is desired and/or appropriate as well as the specific duty cycles that are appropriate for specific operating conditions.

Once the desired duty cycle is determined, the duration and nature of the pulses used to drive the motor can be determined/generated in a wide variety of manners. As will be described in more detail below, one relatively simple approach is to use a pulse width modulation (PWM) controller as the pulse controller 120.

In FIG. 1, logical multiplier 123 is shown as multiplying a pulsed control signal 125 times a power level signal 119 output by machine controller 110 to create a power converter control signal 128. It should be appreciated that the logical multiplier 123 is shown for the purposes of explanation and in practice, the function of the multiplier 123 can be accomplished by the machine controller 110, by the power converter 150, or in other suitable manners. For example, in some embodiments, the machine controller 110 may simply set the output of the power converter 150 to zero during the "off" phases of the duty cycle and to the desired operational output level (e.g., the most efficient output level for the current machine speed) during the "on" phases of the duty cycle.

With regard to the calibration aspects of the present disclosure, one embodiment includes real-time system identification of the vehicle/power plant frequency response. In this process, the electric machine and the DMD converter (e.g., inverter) are used to provide the source excitations for a system identification (ID) process. For example, the inverter can be made to output current waveforms with excitation frequencies of interest. These can be in the form of steady state (e.g., stepped, slowly swept sine, etc.), random, periodic (e.g., chirp, pseudo random, periodic random, etc.), transient (e.g., burst, impact, step relaxation, etc.), or other configurations. This step does not require any external test equipment like a shaker or hammer, which can be beneficial as this process can be conducted on an electric machine during normal operation rather than on a test platform. Such a calibration embodiment can include measuring noise and vibration using on-board accelerometers/ sensors in the vehicle (e.g., vehicles typically have microphones for Bluetooth, wireless communication, and/or an entertainment system, and accelerometers can, for example, be on the vehicle for crash detection).

The electric machine controller/vehicle control unit/computing device will then process the input and outputs from these components and calculate frequency response functions (e.g., regarding noise and vibration) at different locations (e.g., could be all or a subset of available sensors). Through this process peaks can be detected to identify resonances or the data can be compared against a calibratable threshold for the relevant frequency response functions (FRFs). Note that this step could be done while the motor is otherwise operating normally without DMD even turned on. Using the principle of superposition, perturbations of small amplitude can be added to the motor torque on top of the steady/DC torque output.

In some embodiments, automatic calibration of frequency selection and/or avoidance tables can be utilized. For example, they can be used in a process where the electric machine controller scales the measured FRF for torque based on the ideal DMD pulse height (exact scaling could depend on on/off pulsing or a level1/level2 pulsing strategy). This scaling process could be a time domain convolution or a frequency domain multiplication of a measured FRF with the intended pulsing for different torque levels.

In such a process, the NVH levels are estimated for different pulsing frequencies and different levels of motor torque. These estimated values are then compared against calibratable thresholds for each noise/vibration measurement location (e.g., based on established OEM targets). In this manner, all of the frequency options for points that violate any of the thresholds can be eliminated.

In such an embodiment, assuming that pulsing at lower frequencies is more efficient for DMD operation, the lowest frequency of pulsing that is acceptable for NVH can be selected. If the lowest frequency is not necessarily the most efficient, another embodiment could combine the results with an efficiency table as a function of pulsing frequency and the most efficient frequency that is acceptable for NVH based on that information can be selected.

The response can then continue to be monitored after initial calibration to determine if further adjustments are necessary. For example, an operational response along with DMD and motor parameters (e.g., the same NVH parameters, torque, pulsing frequency, high and low levels of pulsing, motor speed, vehicle speed, etc., measured above) can be remeasured.

This information can be used to further adjust to fine tune frequency selection calibrations based on operational responses at different speeds and/or loads. In this manner, the long term NVH evolution for diagnostic data collection purposes can continue to be monitored and utilized for fine tuning calibration and can be accomplished during normal operation of the electric machine without any specialized tools or equipment.

Accordingly, these calibration embodiments allow for large scale deployment of DMD with minimal NVH calibration effort. No extraneous sensors and excitation sources are required. The method is self-contained within DMD software leveraging typical production hardware.

Figure 2:
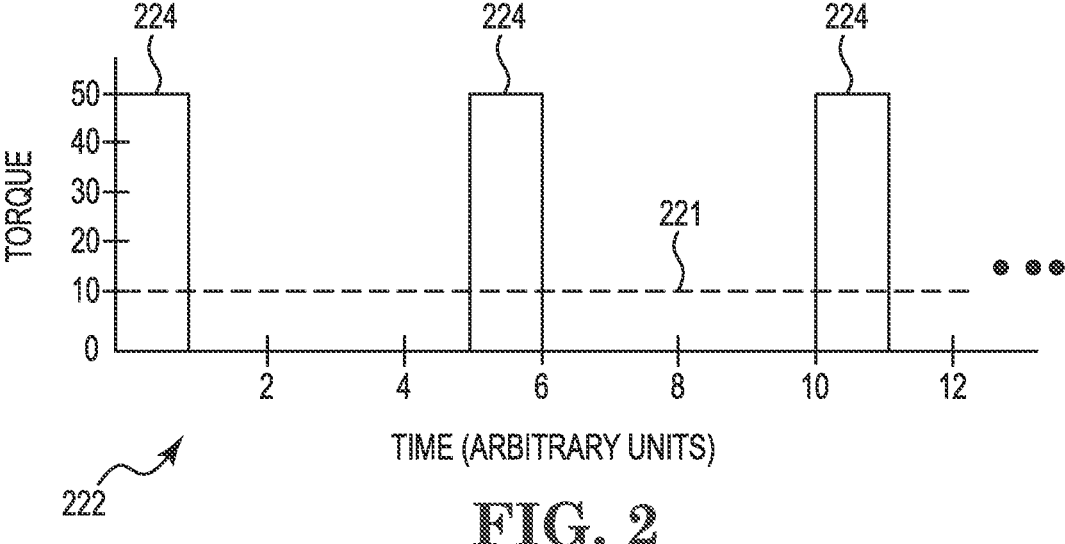
FIG. 2 is a graph illustrating a pulsed drive signal for an electric machine that may be used with embodiments of the present disclosure.

FIG. 2 is a graph illustrating a pulsed drive signal for an electric machine that may be used with embodiments of the present disclosure.

FIG. 2 illustrates an example of pulsed electric machine operation 222. In this particular example, the desired electric machine torque is 10 Nm, but the most efficient torque output for the current operating motor speed is 50 Nm. Conceptually, the electric machine can be driven to deliver a net torque 221 of 10 Nm by causing the electric machine to deliver 50 Nm of torque for 20% of the time and then delivering no (zero) torque the remaining 80% of the time. Since the motor operates more efficiently when it is delivering 50 Nm than when it delivers 10 Nm, the electric machine's overall efficiency can be improved by pulsing the electric machine's operation in the described manner. In the example illustrated in FIG. 2, the electric machine produces a machine output of 50 Nm (labeled 224) for a period of 1 time unit out of every 5 time units and then the electric machine is controlled to produce zero torque during the intervening 4 time units.

As long as the desired electric machine output does not exceed 50 Nm, the desired machine output can theoretically be met merely by changing the duty cycle of the electric machine operating at 50 Nm. For example, if the desired electric machine output changes to 20 Nm, the duty cycle of the electric machine operating at 50 Nm can be increased to 40%; if the desired electric machine output changes to 40 Nm, the duty cycle can be increased to 80%; if the desired electric machine output changes to 5 Nm, the duty cycle can be reduced to 10% and so on. More generally, pulsing the electric machine can potentially be used advantageously any time that the desired electric machine torque falls below the maximum efficiency.

As discussed above, in some embodiments, the waveform frequency can change. In such instances, the waveform cycle will also change. This will allow for a very responsive, high fidelity feedback response for the controller.

For example, the scale of the time units actually used may vary widely based on the size, nature, and design needs of any particular system. In practice, when the electric machine is switched from the "torque on" to "low torque" states relatively rapidly to achieve the designated duty cycle, the fact that the electric machine is actually being switched back and forth between these states may not materially degrade the electric machine's performance from an operational standpoint. In some embodiments, the scale of the periods for each on/off cycle is expected to be on the order of 100 μsec to 10 seconds (i.e., pulsing at a frequency in the range of 0.1 to Hz), as, for example, in the range of 20 to 1000 Hz, or 20 to 100 Hz.

The low torque portions of the waveform cycle might conceptually be viewed as shutting the electric machine off although in many cases the motor may not actually be shut off during those periods or may be shut off for only portions of the "low torque" intervals.

Figure 3:
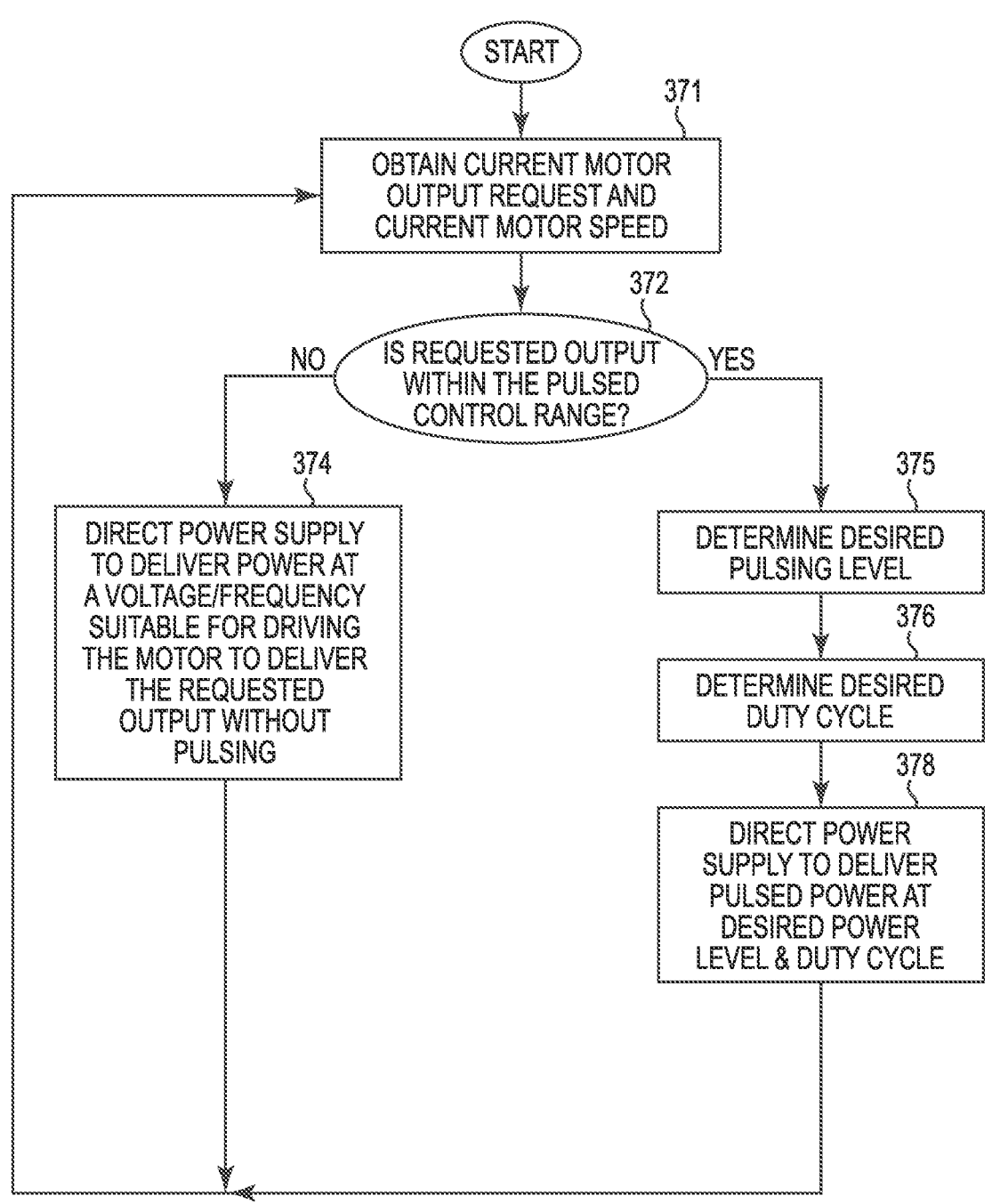
FIG. 3 is a flow chart illustrating a motor control scheme in accordance with embodiments of the present disclosure.

FIG. 3 is a flow chart illustrating a motor control scheme in accordance with embodiments of the present disclosure. FIG. 3 illustrates a control flow that may be performed by machine controller (e.g., 110 of FIG. 1) to cause the electric machine (160) to efficiently deliver a desired torque. To simplify the discussion, an embodiment in which the electric machine (160) functions as a motor is described. In this arrangement, the power supply/sink (130) acts as a power supply and the machine controller (110) functions as a motor controller.

Initially, the motor controller (110) receives the currently requested motor output (113) and any required motor state information such as the current motor speed (164) as represented by block 371. The motor controller (110) then determines whether the requested output is within the pulsed control range as represented by decision block 372. This decision can be made in any desired manner.

By way of example, in some embodiments, a look-up table (115) or other suitable data structure can be used to determine whether pulsed control is appropriate. In some implementations a simple lookup table may identify a maximum torque level at which pulsed control is appropriate for various motor speeds. In such an implementation, the current motor speed may be used as an index to the lookup table to obtain a maximum torque level at which the pulsed control is appropriate under the current operating conditions. The retrieved maximum torque value can then be compared to the requested torque to determine whether the requested output is within the pulse control range.

In other embodiments, the lookup table may provide additional information such as the desired duty cycle for pulsed operation based on the current operating conditions. In one such implementation, the motor speed and the torque request may be used as indices for a lookup table with each entry in the lookup table indicating the desired duty cycle with interpolation being used to determine an operational duty cycle when the actual torque and/or motor speeds are between the index values represented in the table.

If the requested torque/current operating conditions are outside of the pulsed control range for any reason, then traditional (i.e., continuous/non-pulsed) motor control is used as represented by the "no" branch flowing from block 372. As such, pulsing is not used and the power converter is directed to deliver power to the motor at a level suitable for driving the motor to deliver the requested output in a conventional manner as represented by block 374.

Conversely, when the requested torque/current operating conditions are within the pulsed control range, then pulsed control is utilized as represented by the "yes" branch flowing from block 372. In such embodiments, the motor controller will direct the power converter to deliver power to the motor in a pulsed manner.

During the "on" pulses, the power converter is directed to deliver power at a preferred output level which would typically (but not necessarily) be at or close to the maximum efficiency operating level for the current motor speed. During the "off" pulses, the motor ideally outputs zero torque. In some embodiments, the timing of the pulsing is controlled by a pulse controller.

To facilitate pulsed operation, the motor controller determines the desired output level at block 375 and the desired duty cycle at block 376 for pulsed operation at the current motor speed (which is preferably at or close to the system's maximum efficiency energy conversion output level at the current motor speed, although other energy efficient levels can be used as appropriate). The motor controller and the pulse controller then direct the power converter to implement the desired duty cycle at block 378 at the designated power level.

Conceptually, this may be accomplished by effectively turning the power supply on and off at a relatively high frequency such that the fraction of the time that power is supplied to the motor corresponds to the desired duty cycle, and the power level corresponds to the preferred output level. In some embodiments, the "off" portion of the duty cycle may be implemented by directing the power controller/converter to drive the motor to deliver zero torque.

The frequency at which the power is pulsed is preferably determined by the machine controller or the pulse controller. In some embodiments, the pulsing frequency can be fixed for all operation of the motor, while in others it may vary based on operational conditions such as motor speed, torque requirements, etc. For example, in some embodiments, the pulsing frequency can be determined through the use of a look-up table.

In such embodiments, the appropriate pulsing frequency for current motor operating conditions can be looked up using appropriate indices such as motor speed, torque requirement, etc. In other embodiments, the pulsing frequency is not necessarily fixed for any given operating conditions and may vary as dictated by the pulse controller. In some specific embodiments, the pulsing frequency may vary proportionally as a function of motor speed, at least in some operating regions of the motor.

Further, in order to determine the desired pulsing level 375 and the desired duty cycle 376 multiple torque values need to be determined during operation of the motor. This can be accomplished utilizing the torque averaging methodology based on integer multiples as described herein. Through use of the disclosed methodology, the pulsed power delivery, at 378, will be at a more accurate power level and/or duty cycle than could have been accomplished previously. It should be noted that in, representing a potential power estimation methodology, the details of pulsing could involve several solutions to adequately address vibration and/or noise while delivering optimal efficiency.

Provided below are three embodiments that describe various concepts of the present disclosure. For example, in one vehicle embodiment, the vehicle includes an electric machine controller having a processor and memory and instructions that are stored in the memory and executable by the processor to identify a vehicle and/or electric machine frequency response during operation of the vehicle and use the electric machine and a dynamic motor drive converter to choose a dynamic motor drive pulsing frequency based in part on the identified frequency response.

In some such embodiments, the dynamic motor drive converter is an inverter and outputs current waveforms with excitation frequencies based on the identified frequency response. For example, the output current waveforms with excitation frequencies are in the form of one of: steady state, random, periodic, or transient.

In various embodiments, identifying the vehicle and/or electric machine frequency response during operation of the vehicle includes collecting measured noise and vibration sensor data using at least one on-board sensor in the vehicle. This data can, for example, be collected from a microphone for Bluetooth communication by a vehicle occupant, a microphone for wireless communication by the vehicle occupant, a microphone for use by the vehicle occupant with an entertainment system, a microphone for use by the vehicle occupant with a navigation system, and/or an accelerometer for crash detection.

In some embodiments, the measured noise and vibration sensor data can be processed to calculate frequency response functions due to a source excitation. This can, for example, be accomplished by instructions that execute to detect peaks in the calculated frequency response functions to identify resonances or to compare the frequency response against a calibratable threshold to determine peaks that are of a magnitude that need to be mitigated. In some implementations the instructions execute to change the dynamic motor drive pulsing frequency if it is determined that the peaks are of a magnitude that need to be mitigated.

In another embodiment, for an electric machine controller in a vehicle, the electric machine controller has a processor and memory and instructions that are stored in the memory and executable by the processor to calibrate frequency selection or avoidance tables, wherein the calibration includes scaling at least one measured frequency response function for torque based on an ideal dynamic motor drive pulse height. The embodiment also includes instructions to estimate a number of noise, vibration, harshness (NVH) levels at different locations on the vehicle for different pulsing frequencies and different levels of motor torque.

In this embodiment, the estimated NVH levels are compared against at least one calibratable threshold for each different location, determine which estimated NVH levels meet or exceed a threshold, and assuming that pulsing at lower frequencies is more efficient for dynamic motor drive operation, select a frequency of electric machine pulsing that is acceptable for NVH. In some implementations, the lowest frequency of electric machine pulsing that is acceptable for NVH can be selected.

Selecting a frequency of electric machine pulsing that is acceptable for NVH can, for example, include combining the selection results with data such as in an efficiency table as a function of pulsing frequency. In such a structure, a most efficient frequency that is acceptable for NVH can be selected.

In some embodiments, at least one measured frequency response function for torque based on an ideal dynamic motor drive pulse height is accomplished by time domain convolution. Scaling can also, for example, be accomplished by a frequency domain multiplication of one of the measured frequency response functions with a frequency domain representation of a waveform with an intended pulsing frequency for different torque levels.

In another example embodiment, an electric machine controller in a vehicle has a processor and memory and instructions that are stored in the memory and executable by the processor to monitor operational NVH responses after initial calibration wherein initial calibration includes calibrating frequency selection or avoidance tables, wherein the calibration includes scaling at least one measured frequency response function for torque based on an ideal dynamic motor drive pulse height, measure NVH operational responses along with one or more dynamic motor drive or electric motor parameters, and adjust a frequency selection calibration based on the measured NVH operational response at different speeds or torque loads. In various such embodiments, the instructions execute to continue to monitor long term NVH evolution for diagnostic data collection purposes and wherein the diagnostic data is stored in memory.

In some embodiments, the one or more dynamic motor drive or electric motor parameters is selected from the group of parameters including: torque, pulsing frequency, high level of pulsing, low level of pulsing, motor speed, and vehicle speed. The waveform cycle can also vary as a function of a rotational speed of the electric machine.

A first level output can, for example, be a torque level at which the motor is most efficient at its given rotational speed and a second output level is 0 percent torque. In some embodiments, during the pulsed operation of the electric machine, the electric machine is turned off for at least portions of the times that the electric machine outputs zero torque.

In various embodiments, a period between beginnings of sequential first output level pulses can be defined as the waveform cycle. The waveform cycle can, for example vary during operation of the electric machine. These embodiments can improve the electric machine performance and/or system efficiency by providing more accurate calibration and verification of power usage.

Figure 4:
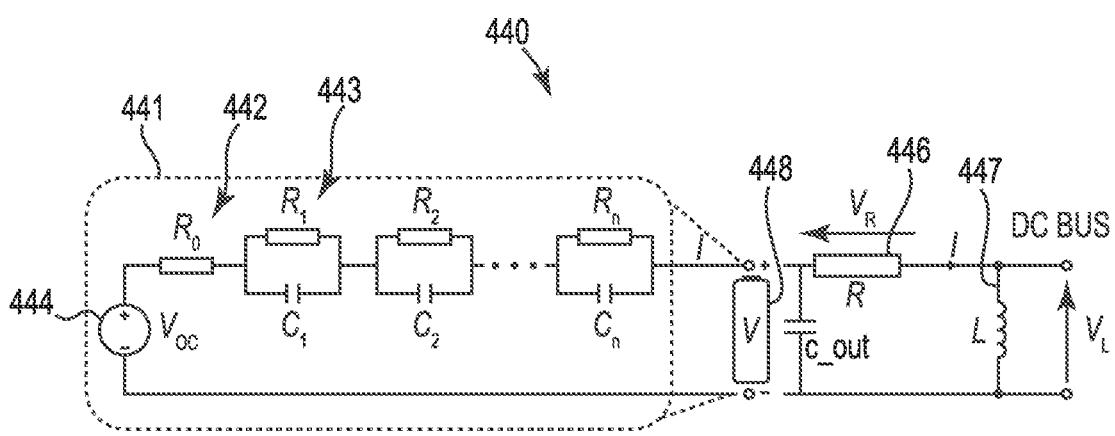
FIG. 4 is an equivalent circuit model (ECM) that can be used to estimate battery system dynamics and pulsed power loss and may be used with embodiments of the present disclosure.

FIG. 4 is an equivalent circuit model (ECM) that can be used to estimate battery system dynamics and pulsed power loss and may be used with embodiments of the present disclosure. In a power system, such as that depicted at 440 in FIG. 4, batteries (e.g., 448) are commonly approximated as a voltage source 441, denoted as the open circuit voltage (OCV or V_OC) 444, followed by a series resistance 442 and one or more parallel resistor-capacitor (RC) branches 443, as illustrated in FIG. 4. The number of RC branches is selected to capture the desired dynamic behavior, where 2-4 branches usually suffice. Additional components to the ECM (e.g., 446, 447) can be included to capture resistive, capacitive, and inductive behavior in the high voltage power distribution system (DC bus) and ancillaries.

The OCV, resistances, capacitances, and inductances are typically determined empirically on a test stand with well-known test procedures under tightly controlled conditions. Voltage hysteresis between charging and discharging is also commonly included. Alternatively, there are ways of using more advanced techniques to calculate or adjust these parameters in regular operation. Alternatively, high-fidelity simulations could also be used in place of stand tests.

FIG. 5 is an example of sample ECM model parameters that may be used with embodiments of the present disclosure. Table 1 shows an example of battery ECM parameters from a commercial 18650 cell (LG INR18650MJ1). These also illustrate a function of battery temperature and battery state of health (SOH). Even though it is possible to extend single-cell characteristics to a multi-cell module or pack, it may be valuable to characterize a pack ECM directly to capture the effects of contact resistances and wiring/bus bars.

Once the ECM parameters are known, the pulsed efficiency impacts can be estimated analytically. Determining such parameters can be accomplished, for example, wherein the average power $\bar{P}$ delivered by the battery at a given OCV and mean current $\bar{I}$ is given by the following equation:

$$\bar{P} = \left( OCV - \frac{\bar{I}}{D} R_{eq} \right) \bar{I}$$

where $R_{eq}$ is the equivalent series resistance and D is the pulsed current duty cycle, assuming a standard pulse-width modulation signal. The equivalent series resistance $R_{eq}$ is, therefore, an important ECM parameter needed to calculate the standard or continuous power and pulsed power, and in turn the potential pulsed power loss.

The impedance Z for a sinusoidal current function of frequency f for a four RC branch ECM is defined as:

$$Z(f) = R_0 + \frac{R_1}{1 + j \cdot 2\pi f R_1 C_1} +$$
$$\frac{R_2}{1 + j \cdot 2\pi f R_2 C_2} + \frac{R_3}{1 + j \cdot 2\pi f R_3 C_3} + \frac{R_4}{1 + j \cdot 2\pi f R_4 C_4}$$

A capacitor or capacitor bank $C_{out}$ can be added at the output of the battery to mitigate the losses that result from higher current pulses. In this case, the updated impedance Z will be:

$$Z_{new}(f) = \frac{Z(f)}{1 + j \cdot 2\pi f C_{out} \cdot Z(f)}$$

$C_{out}$ will be functioning as reactive power compensator and improve the total power loss. Since $C_{out}$ is not a part of battery itself and it will not affect the algorithm, we will focus on battery itself and ignore $C_{out}$ in the calculation below.

The resistances and capacitances used in the equation above are shown in the table in FIG. 5 at 552 and 553, respectively along with the state of charge and voltage at 551. The variable j is the imaginary unit denoting a complex number.

Figure 6:
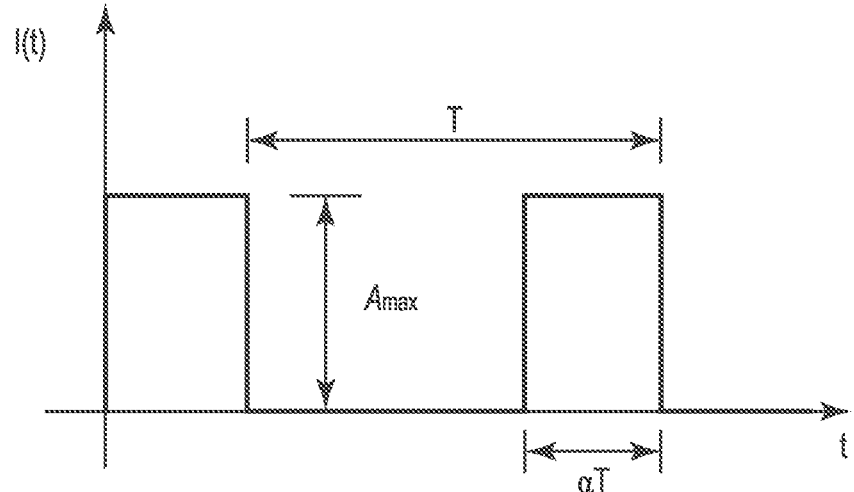
FIG. 6 is an example of a pulse-width modulated square waveform and its dimensional elements which may be used with embodiments of the present disclosure.

FIG. 6 is an example of a pulse-width modulated (PWM) square waveform and its dimensional elements which may be used with embodiments of the present disclosure. For a PWM signal, the function I(t), as depicted in FIG. 6, can be approximated using a Fourier series expansion:

$$I(t) \approx \alpha A_{max} + \frac{2A_{max}}{\pi} \sum_{n=1}^{\infty} \frac{\sin(\alpha n\pi)}{n} \cos(n\omega t) \quad n = 1, 2, 3...$$

where $\alpha$ is the proportion of on-time, i.e., duty cycle, $A_{max}$ is the pulse amplitude, $\omega$ is the angular frequency in rad/s, t is time and n is the number of harmonics being considered. Other types of waveforms can be similarly parameterized and approximated.

The apparent power, S, can be obtained from the following equation, where the actual power is given by the real component Re(S):

$$S = (\alpha A_{max})^2 \cdot Z(0) + \sum_{n=1}^{\infty} \left[ \left( \sqrt{2} \frac{A_{max}}{\pi} \frac{\sin(\alpha n\pi)}{n} \right)^2 Z(n \cdot f) \right]$$

The equivalent resistance is then calculated from the real power using the standard resistive power relationship:

$$R_{eq} = \frac{Re(S)}{I_{rms}^2} = \frac{Re(S)}{A_{max}^2 \cdot \alpha} = \frac{Re(S) \cdot \alpha}{I^2}$$

Figure 7:
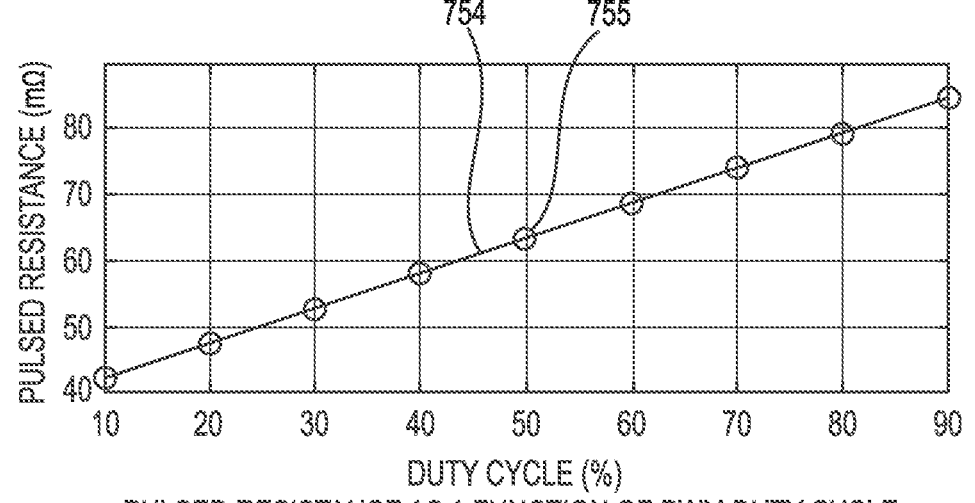
FIG. 7 illustrates a trend of equivalent resistance at a given frequency for a range of duty cycles that may be obtained through use of embodiments of the present disclosure.
Figure 8:
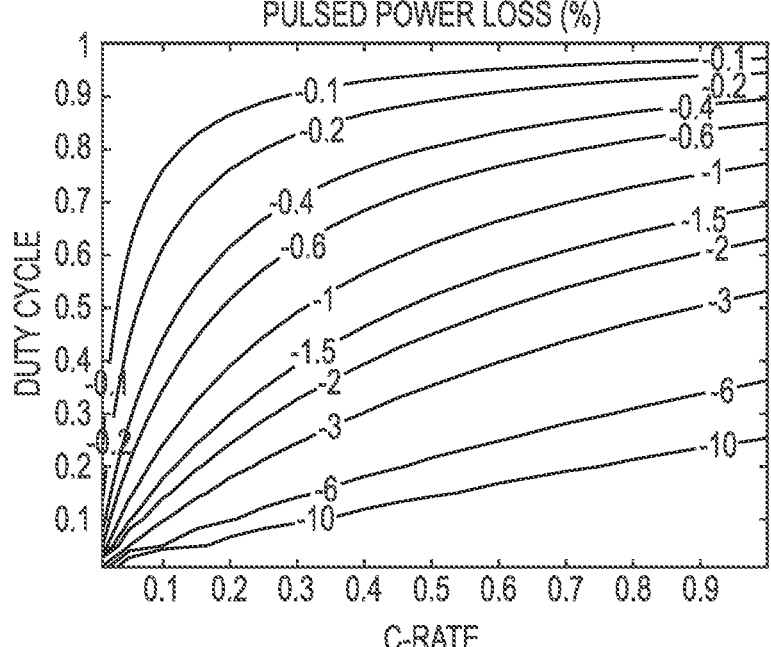
FIG. 8 is an illustration of power loss from a pulsed current at mean current rate (C-rate) and pulse duty cycle through use of embodiments of the present disclosure.

FIG. 7 illustrates a trend of equivalent resistance at a given frequency and mean current (C-rate) for a range of duty cycles that may be obtained through use of embodiments of the present disclosure. Based on these relationships, the pulse power loss 754 at various duty cycle values 755 can be calculated from the ratio of average power under pulsing conditions to non-pulsing or DC power at the same mean current. An example loss map is shown in FIG. 8 at a given OCV, frequency, and temperature. The losses increase rapidly with higher currents (C-rates) and duty cycles.

Similar maps could be created for pulse frequency, cell temperature, SOC and SOH. This loss factor can be used in DMD system optimization to select waveform parameters which deliver an overall positive efficiency gain. An algorithm to accomplish this is discussed in the following section.

$$\eta_{pulse} = \left( \frac{\bar{P}_{pulse}}{P_{DC}} - 1 \right)$$

FIG. 8 is an illustration of power loss from a pulsed current at mean current rate (C-rate) and pulse duty cycle through use of embodiments of the present disclosure. A system optimization needs to be carried out combining the DMD gains for motor/inverter system and the battery power loss estimate. NVH constraints would also typically be part of the optimization. An outline of a method for adjusting the duty cycle parameter is shown below:

1. Input current motor speed and driver torque request.
2. Determine DMD waveform parameters (frequency, duty cycle, amplitude) for maximum motor/inverter efficiency based on model or look-up table.

3. Determine DMD efficiency gain compared with standard operation based on model type or look-up table.
4. Estimate average current on the DC bus based on voltage (e.g., bus voltage).
5. Calculate equivalent battery resistance for selected DMD waveform parameters, battery SOC, SOH, and temperature.
6. Calculate battery pulsed power loss for selected DMD waveform parameters, battery SOC, SOH, and temperature.
7. Estimate overall system gain.
8. If system gain is negative (loss), increase pulse duty cycle and loop back to Step 3.
9. If system gain is positive and the gradient is also positive (or first iteration), decrease pulse duty cycle and loop back to Step 3.
10. If system gain is positive and the gradient is zero or negative, select previous pulse duty cycle and exit loop.

NVH constraints may enter at various parts of this optimization loop depending on the control parameters. For example, if pulse frequency is solely used to mitigate vibrations, then the duty cycle optimization for the motor-battery can be performed first, then the acceptable frequency for that torque amplitude can be determined. In terms of the method above, this step would be an additional step at the end. If it's necessary to simultaneously optimize multiple parameters that affect both efficiency and NVH, then NVH constrains should be considered within the loop (e.g., when determining the electric machine-inverter gains or overall system gains).

Other parameters can be included in the optimization as necessary, with the loop conditions (e.g., gradient) set based on the efficiency trends associated with each parameter. The method shown above is a conceptual example to illustrate the general idea. In practice, an optimization process should be selected to match the characteristics of the underlying functions and acceleration convergence. For some of these, it may be beneficial to create approximate mathematical functions and derivatives through mathematical methods known in the art.

Depending on the parameters being considered and the computational capability available from the on-board computer, the optimization could be performed either online or offline. In some embodiments, an offline optimization could use advanced machine learning methods to capture many inputs and non-linear effects.

These machine learning models also carry a larger computational burden that would need to be justified and managed. An online optimization would likely have to be simpler in terms of degrees of freedom. At the same time, it would provide larger flexibility to independently modify subcomponents like the motor/inverter efficiency and battery power loss. Furthermore, an online optimization could lend itself to predictive controls and trajectory optimization.

Given the additional complexity of DMD controls and system impacts, both the underlying models and the optimization could benefit from more advanced methods compared with ones already in use. This may become even more critical if components beyond the motor/inverter and the battery are included, such as the high voltage distribution system, ancillaries, etc.

One example of this alternative application is capturing battery degradation and change in internal resistance over time. In this case, online training algorithms for machine learning and artificial intelligence could provide the mechanism for self-calibration of the battery equivalent circuit model.

Reduced order physics-based models are also becoming more feasible to deploy in embedded systems with improved computational capabilities. When properly designed and calibrated, these alternative embodiments could provide a more generalized approach to capture the complex behavior and evolution in Li-ion batteries under pulsing conditions.

Provided below are three embodiments that describe various concepts of the present disclosure. For example, in one electric machine controller in a vehicle, the electric machine controller has a processor and memory and instructions that are stored in the memory and executable by the processor to receive a current motor speed and a driver torque request, determine a maximum motor or inverter efficiency, and determine a dynamic motor drive (DMD) efficiency gain compared with standard operation. This embodiment also includes instructions to estimate average current, calculate equivalent battery resistance, calculate pulsed power loss, estimate overall system gain, and determine whether the system gain is negative or positive and adjusting the pulse duty cycle differently based on the negative or positive determination. In some implementations, the DMD waveform parameters are selected from the group including: frequency, duty cycle, and amplitude.

In some embodiments, the maximum motor or inverter efficiency can be determined based on a model type or on data in a look-up table. The dynamic motor drive efficiency gain compared with standard operation can also be determined based on an electric machine model type or data in a look-up table.

In various implementations, the average current can, for example, be estimated based on bus voltage measured on a DC bus. The equivalent battery resistance can be calculated for one or more selected DMD waveform parameters. The equivalent battery resistance can also be calculated for a battery state of charge (SOC), for a state of health (SOH), and/or for a temperature.

In another example embodiment, an electric machine controller in a vehicle, has a processor and memory and instructions that are stored in the memory and executable by the processor to receive a current motor speed and a driver torque request, determine a maximum motor or inverter efficiency, and determine a dynamic motor drive (DMD) efficiency gain compared with standard operation. This embodiment includes instructions to estimate average current, calculate equivalent battery resistance, calculate pulsed power loss, estimate overall system gain based on the calculated equivalent battery resistance and pulsed power loss, and determine whether the system gain is negative or positive and adjusting the pulse duty cycle differently based on the negative or positive determination.

In some implementations, the pulsed power loss can, for example, be calculated for one or more selected DMD waveform parameters, for a state of health (SOH), for a battery state of charge (SOC), and/or for a temperature.

In another example embodiment, an electric machine controller in a vehicle includes a processor and memory and instructions that are stored in the memory and executable by the processor to receive a current motor speed and a driver torque request, determine a maximum motor or inverter efficiency, and determine a dynamic motor drive (DMD) efficiency gain compared with standard operation. The embodiment also includes instructions to estimate average current, calculate equivalent battery resistance, calculate pulsed power loss, estimate overall system gain, and determine whether the system gain is negative or positive and adjusting the pulse duty cycle differently based on the negative or positive determination.

In some embodiments, if system gain is negative, increase pulse duty cycle and loop back to determine the DMD efficiency gain compared with standard operation. Further, if system gain is positive and the gradient of iterative gain is also positive, decrease pulse duty cycle and loop back to determine the DMD efficiency gain compared with standard operation. And, if system gain is positive and a gradient is zero or negative, a previous pulse duty cycle can be selected. As with the previous examples, embodiments such as these can improve the electric machine performance and/or system efficiency by providing more accurate calibration and verification of power usage.

Figure 9A:
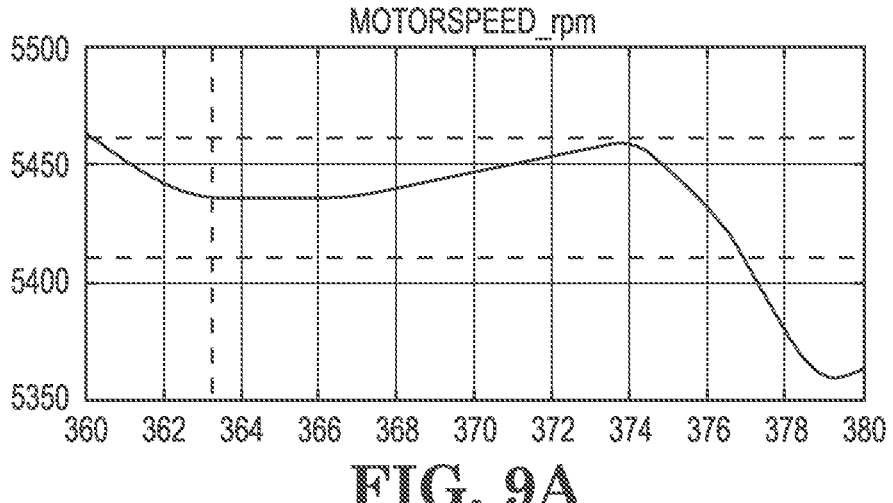
FIG. 9A is an example of speeds of an electric machine at which the embodiments of the present disclosure can be beneficial.
Figure 9B:
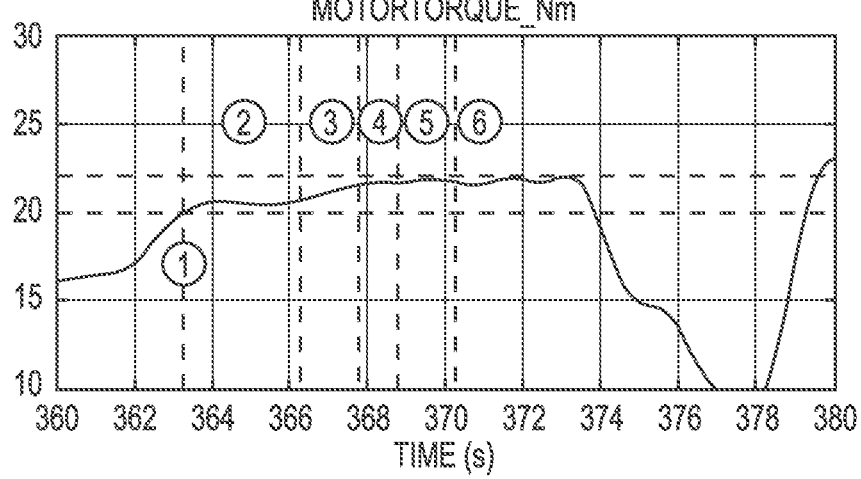
FIG. 9B is an example of torque quantities of an electric machine at which the embodiments of the present disclosure can be beneficial.
Figure 9C:
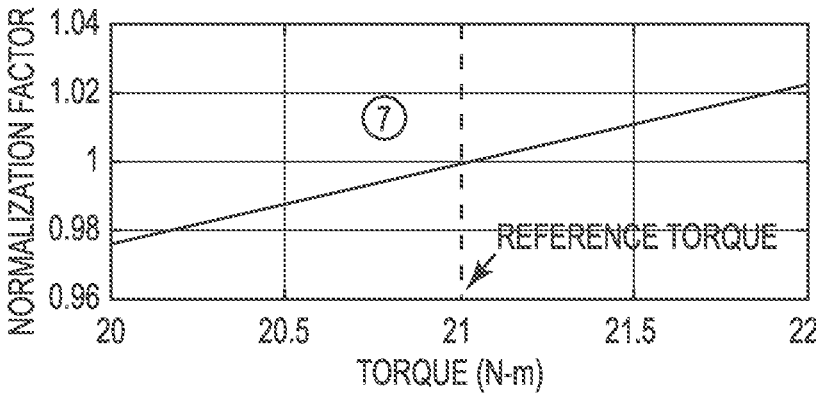
FIG. 9C is an example of a normalization scheme to handle torque variations during the sampling period according to embodiments of the present disclosure.

FIG. 9A is an example of speeds of an electric machine at which the embodiments of the present disclosure can be beneficial. FIG. 9B is an example of torque quantities of an electric machine at which the embodiments of the present disclosure can be beneficial. FIG. 9C is an example of a normalization scheme to handle torque variations during the sampling period according to embodiments of the present disclosure. In these combined examples, a method of normalizing torque variations is illustrated.

Provided below is a method embodiment according to the present disclosure and provides the methodology for the data shown in the example in FIGS. 9A-9C. The method illustrated below depicts an embodiment where there is a comparison between the parameters of DMD mode and a continuous mode. The numbers on FIGS. 9A-9C are representative of the element numbers provided below (e.g., #1 on FIG. 9A corresponds to element #1, "In a warmed up state, . . . " below). This method provides:

1. In warmed up state, enter torque window, set base speed value.
2. Flag as "Steady" if in DMD and stay within torque/ speed windows for X sec (~3).
3. Record DMD battery terminal voltage and/or current (V/I) for Y sec (~1.5), compute power.
4. Transition to continuous mode, wait Z sec (~1).
5. Record continuous mode battery terminal V/I for Y sec, compute power.
6. Resume normal DMD operation.
7. Determine and apply power and/or current normalization factors, then calculate average powers and/or currents.
8. Calculate expected gain in power and/or current from pre-calibrated electric machine maps and/or look up tables (LUTs).
9. Compare the DMD gain vs. expected gain from maps/ LUTs.
10. If DMD gain is lower than expected by some threshold, take action. For example:
   1. Prohibit DMD for torque≥reference torque at given electric machine speed/temp./bus voltage.
   2. Throw error.
   3. Alter DMD "on" torque.
11. If method aborted during Step 4, the controller can save the data from Step 1-3 and complete Step 5+ if the torque/speed window is re-entered at a later time (as long as motor temp. and voltage are similar enough).

Figure 10:
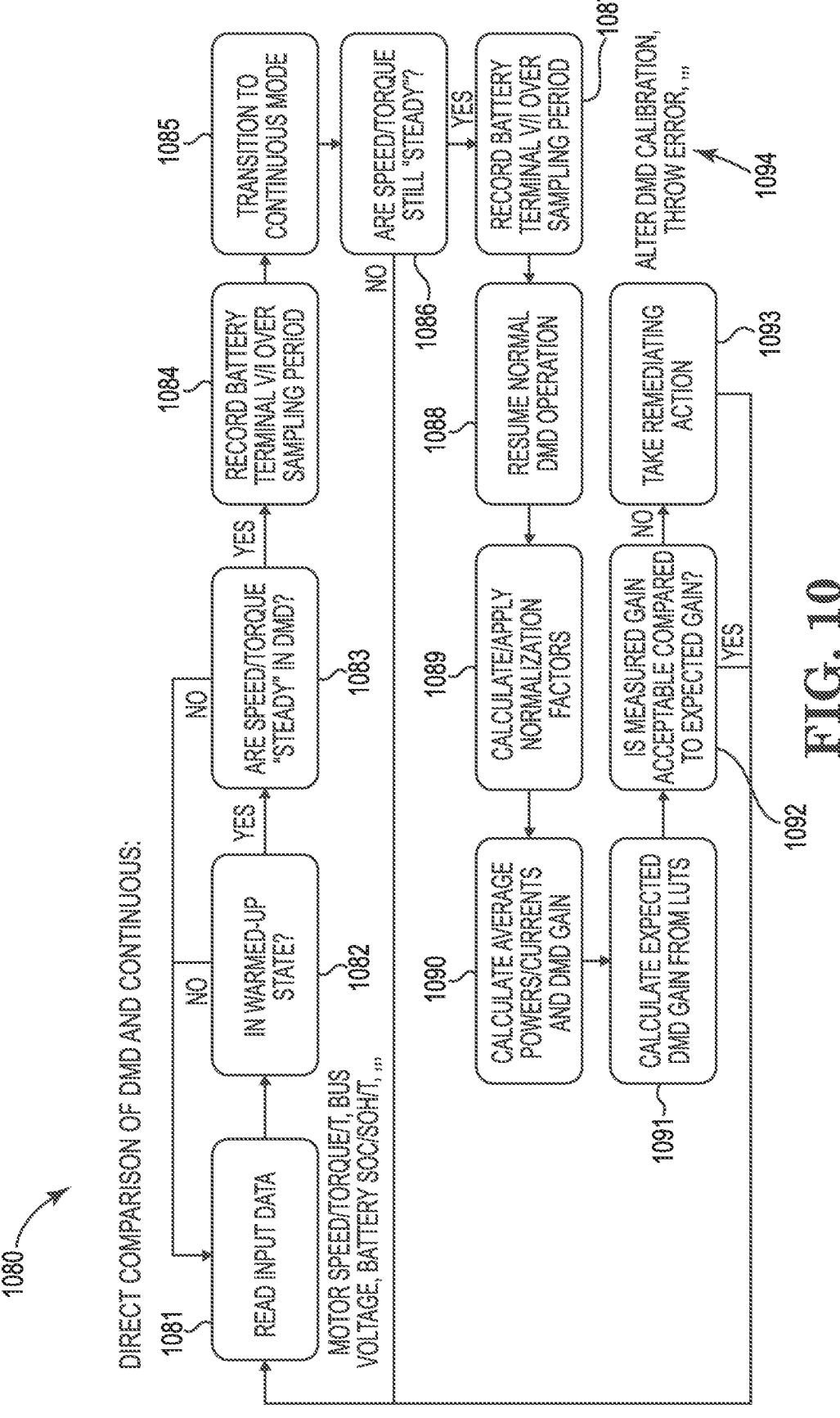
FIG. 10 is a method embodiment according to the present disclosure.

FIG. 10 is another description of a DMD-continuous method embodiment according to the present disclosure. The method illustrated below depicts an embodiment where there is a comparison between the parameters of DMD mode and a continuous mode.

This method 1080 provides: reading input data at 1081. The input data can, for example, include, electric machine speed, torque, voltage, battery SOC, SOH, and/or temperature. This data can be taken from sensors associated with the electric machine and/or the vehicle in which the electric machine is operating, taken from memory, such as a look up table, and/or taken from data input into the system from a resource or computing device outside the system.

This method also includes checking to determine whether the electric machine is in a warmed up state 1082 and whether the speed and/or torque are steady in DMD mode at 1083. If either of these are "no", then the method returns to 1082. If "yes", then at least one of the battery voltage and/or current are recorded over the period of time at 1084.

The electric machine is then transitioned to continuous mode at 1085 for collection of continuous mode data. The electric machine is then checked to determine whether the speed and/or torque are steady in continuous mode at 1086. If the determination is "no", then the method returns to 1081. If "yes", then at least one of the battery voltage and/or current are recorded over the period of time at 1087. The electric machine can then return to normal operation at 1088.

In some embodiments, a corresponding length of time can be used to record the DMD mode and continuous mode data. This can make comparing the data sets easier.

Once this data is recorded, the electric machine controller can calculate and apply normalization factors at 1089, as shown regarding FIGS. 7 and 9A-9C. The data can also be utilized to calculate average power and/or current values for the recording period and a DMD gain based on a comparison of the DMD data and the continuous data at 1090.

This embodiment can be beneficial in that the DMD gain is based on two data sets acquired during actual operation of the electric machine and may make the analysis more accurate. Also, it may allow for better fine tuning as subsequent data sets can be taken after adjustments from previous data comparisons have been implemented.

Further, in this method, an expected DMD gain can be calculated from data stored in memory, such as in one or more look up tables (LUTS), at 1091. The actual gain can then be compared to the expected gain to determine whether the actual gain is acceptable at 1092. The determination can be, for example whether the actual DMD gain is over a threshold value based on the expected gain value.

If it is acceptable, the method returns to 1081. If it is not acceptable, then the electric machine controller can take an action 1093 to increase the DMD gain. For example, the controller at 1094 can alter the DMD calibration, give an error indication, and/or prohibit DMD for torque greater than or equal to the reference torque at given electric machine speed, temperature, and/or voltage, among other actions that may be taken.

Figure 11:
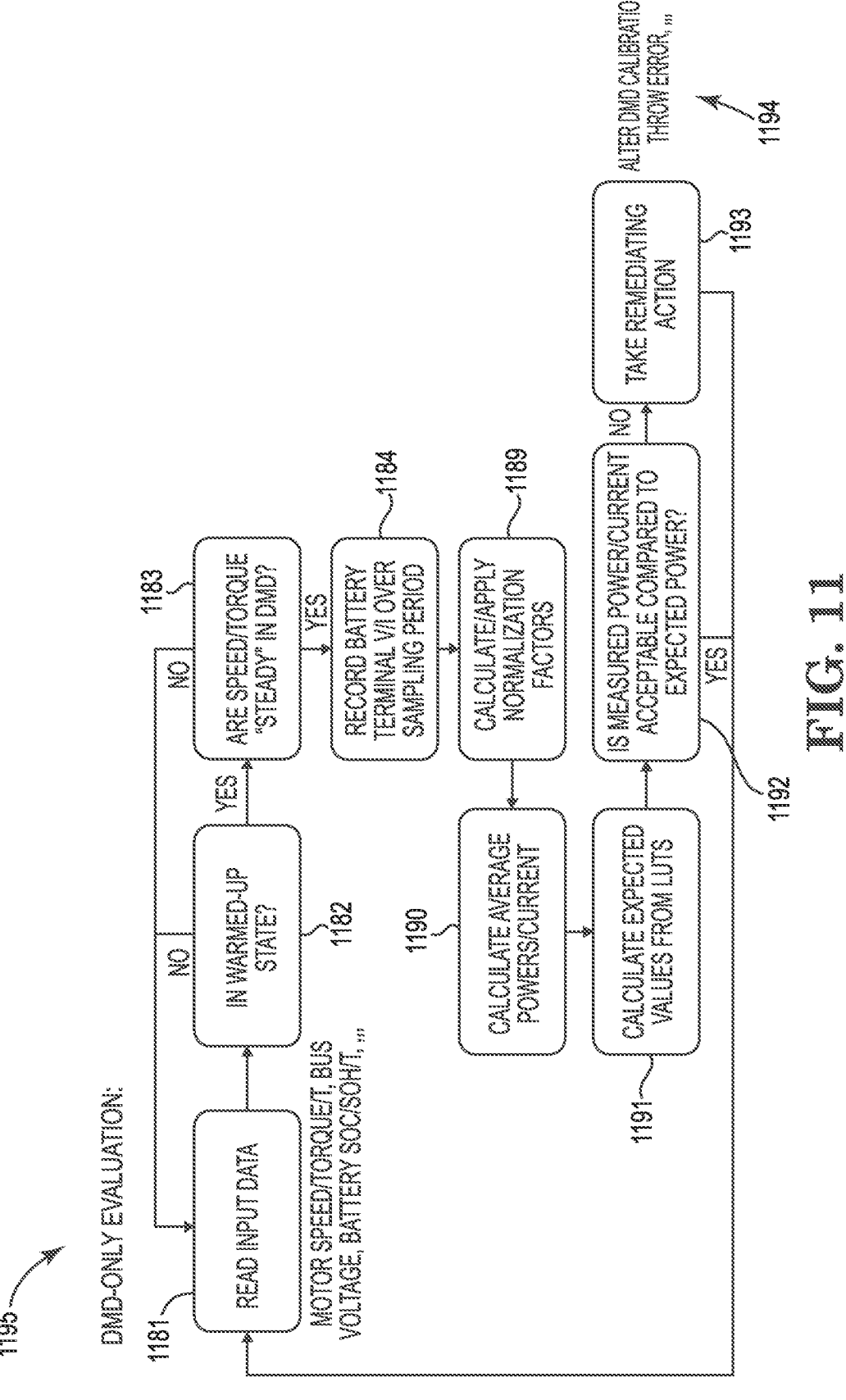
FIG. 11 is another method embodiment according to the present disclosure.

FIG. 11 is another method embodiment according to the present disclosure. The method illustrated depicts an embodiment where only the parameters of DMD mode are utilized.

This method is similar to that of FIG. 10 but has some differences that will be discussed below. This method 1195 similarly provides: reading input data at 1181. As above, the input data can, for example, include, electric machine speed, torque, voltage, battery SOC, SOH, and/or temperature. This data can be taken from sensors associated with the electric machine and/or the vehicle in which the electric machine is operating, taken from memory, such as a look up table, and/or taken from data input into the system from a resource or computing device outside the system.

This method also includes checking to determine whether the electric machine is in a warmed up state 1182 and whether the speed and/or torque are steady in DMD mode at 1183. If either of these are "no", then the method returns to 1182. If "yes", then at least one of the battery voltage and/or current are recorded over the period of time at 1184.

However, in this method, instead of transitioning to continuous mode for collection of continuous mode data, the electric machine controller calculates and applies normalization factors at 1189, as shown regarding FIGS. 7 and 9A-9C, and skips collecting data in continuous mode. As in FIG. 10, the data can also be utilized to calculate average power and/or current values for the recording period and a DMD gain based on a comparison of the DMD data at 1190.

Further, in this method, an expected DMD power and/or current can be calculated from data stored in memory, such as in one or more look up tables (LUTS), at 1191. The actual power/current can then be compared to the expected power/current to determine whether the actual power/current is acceptable at 1192. As in the above embodiment, the determination can be, for example, whether the actual DMD power/current is over a threshold value based on the expected power/current value.

If it is acceptable, the method returns to 1181. If it is not acceptable, then the electric machine controller can take an action 1193 to increase the DMD gain. For example, the controller at 1194 can alter the DMD calibration, give an error indication, and/or prohibit DMD for torque greater than or equal to the reference torque at given electric machine speed, temperature, and/or voltage, among other actions that may be taken.

Additionally, provided below is an example of an alternative embodiment that only uses the DMD mode parameters, that is similar to the illustrated in FIG. 11, but includes some differences and references some example components and values that may be helpful in understanding the embodiments of the present disclosure. In this method, the process includes:

1. In warmed up state, enter torque window, set base speed value.
2. Flag as "Steady" if in DMD and stay within torque/speed windows for X sec (~3).
3. Record DMD battery terminal V/I for Y sec (~1.5), compute power.
4. Apply power and/or current normalization factors, then calculate average power and/or current.
5. Calculate expected power/current from pre-calibrated maps/LUTs.
6. Compare DMD power and/or current vs. expected value from maps/LUTs.
7. If DMD power/current is higher than expected by some threshold, take action. For example:
   1. Prohibit DMD for torque reference torque at given motor speed/temp./voltage.
   2. Throw error.
   3. Alter DMD "on" torque.

Provided below are three embodiments that describe various concepts of the present disclosure. For example, in one electric machine controller in a vehicle, the electric machine controller has a processor and memory and instructions that are stored in the memory and executable by the processor to receive electric machine operational data including at least one of: motor speed, torque, voltage, battery state of charge, state of health, and electric motor temperature. The controller includes instructions that are stored in the memory and executable by the processor to determine if the electric machine is in a warmed up state, initiate a torque activation window, set a base speed value, and determine if the electric machine is in a dynamic motor drive (DMD) mode and stays within the torque activation window for a first time period.

The embodiment also includes instructions to record one or more of a DMD battery terminal voltage and a DMD battery terminal current for a second time period, then compute DMD power, transition to a continuous mode, wait for a third time period, record one or more of a continuous mode battery terminal voltage and a continuous mode battery terminal current for a fourth time period, then compute continuous power, and resume a normal DMD operation process.

In some such embodiments, the controller includes instructions that are stored in the memory and executable by the processor to: compare the measured DMD torque/speed with a reference torque/speed to determine a normalization factor and apply the normalization factor to the operational data to calculate average powers and/or currents. Additionally, the controller can include instructions that are stored in the memory and executable by the processor to: calculate an expected gain in power and/or current based on the operational data and compare the DMD gain to the expected gain or to a threshold value.

If a DMD gain is lower than the expected gain or threshold value, the electric machine controller can, for example, initiate an action to modify a DMD process, can prohibit DMD initiation for torque that is greater than or equal to a reference torque at a particular electric machine speed, or can prohibit DMD initiation for torque that is greater than or equal to a reference torque at a particular temperature. The temperature can, for example, be taken from an internal sensor within the motor or the oil/coolant temperature for the motor.

Further, if a DMD gain is lower than the threshold value, the electric machine controller can prohibit DMD initiation for torque that is greater than or equal to a reference torque at a particular voltage. And, in some implementations, if a DMD gain is lower than a threshold, the electric machine controller can initiate an error indication or can initiate an alteration to a DMD "on" torque process value.

In some implementations, the first time period can be, for example, at least two seconds, the second time period can be at least one second, the third time period can be at least one second, and/or the second time period can be the same as the fourth time period. Also, in various embodiments, setting a base speed value can, for example, be based on determining whether a torque is at a steady value at a particular speed and, if it is a steady value, setting that speed as the base speed value.

In another example embodiment, an electric machine controller in a vehicle has a processor and memory and instructions that are stored in the memory and executable by the processor to receive electric machine operational data including at least one of: motor speed, torque, voltage, battery state of charge, state of health, and electric motor temperature. The controller in a vehicle has a processor and memory and instructions that are stored in the memory and executable by the processor to determine if the electric machine is in a warmed up state, initiate a torque activation window, set a base speed value, determine if the electric machine is in a dynamic motor drive (DMD) mode and, if so, stays within the torque activation window, record multiple measurements of one or more of a DMD battery terminal voltage and a DMD battery terminal current during the torque activation window, then compute DMD power for each measurement, determine a normalization factor from the measured speed/torque values compared to the base speed/torque values and apply the normalization factor to the operational data to calculate average powers and/or currents.

In various embodiments, the controller includes instructions that are stored in the memory and executable by the processor to: calculate an expected power and/or current based on the operational data and compare a DMD power and/or current to the expected power and/or current or calculate a DMD average power and/or current and compare the DMD power and/or current to a threshold value.

In the example embodiment below, an electric machine controller in a vehicle includes a processor and memory and instructions that are stored in the memory and executable by the processor to receive electric machine operational data including at least one of: motor speed, torque, voltage, battery state of charge, state of health, and electric motor temperature. The controller in a vehicle includes a processor and memory and instructions that are stored in the memory and executable by the processor to determine if an electric machine is in a warmed up state, initiate a torque activation window that initiates a dynamic motor drive (DMD) mode, set a base speed value, evaluate if operation stays within the torque activation window for a first time period, and record one or more of a DMD battery terminal voltage and a DMD battery terminal current for a second time period, then compute DMD power.

The embodiment also includes instructions to transition to a continuous mode, wait for a third time period, record one or more of a continuous mode battery terminal voltage and a continuous mode battery terminal current for a fourth time period, then compute continuous power, compare the measured speed/torque values with the base speed/torque values to determine a normalization factor and apply the normalization factor to the operational data to calculate average powers and/or currents, calculate an expected gain in power and/or current based on the operational data and compare the DMD gain to the expected gain or to a threshold value, and wherein if a DMD gain is lower than the expected gain or threshold value, the electric machine controller initiates an action to modify a DMD process. In various embodiments, the expected value can be determined through testing on similar machines or on this particular machine.

In such embodiments, if a DMD gain is lower than a threshold, the electric machine controller can, for example, initiate an error indication and/or initiate an alteration to a DMD "on" torque process value.

Embodiments of the present disclosure utilize techniques disclosed herein to calibrate a DMD system for a vehicle. They can be used to set initial calibration but also diagnostic checking of that calibration during the life of the vehicle.

When considering the fact that vehicle dynamics change based upon road conditions, vehicle loading, etc., dynamic calibration as well as checking of DMD during vehicle use could be very beneficial in some applications. For example, on a noisy road it can be appreciated that the DMD gain can be pushed up by selecting a calibration that results in higher NVH but still low enough for the noisy road to mask the resultant increase in NVH from DMD modulation. This could be accomplished dynamically by pushing the DMD gain as high as the current vehicle NVH will allow.

This could be done by having at least one NVH sensor to detect the current NVH for either a preselected NVH calibration, feedforward, or use as feedback for the selection of the NVH calibration according to current conditions. The sensor data could be sampled periodically during vehicle use.

The data could periodically be analyzed during vehicle use to determine if an adjustment could be made to raise or lower the DMD effect to stay near to but at or below a NVH threshold value that is based on the data analyzed from the at least one NVH sensor.

Embodiments of the present disclosure provide methods, systems, and devices for electric machine drive calibration, verification, and efficiency improvement. These embodiments also can improve the electric machine performance and/or system efficiency by providing more accurate calibration and verification of power usage.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion and not a restrictive one. Combination of the above embodiments, and other embodiments not specifically described herein, will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. An electric machine controller in a vehicle, wherein the electric machine controller has a processor and memory and instructions that are stored in the memory and executable by the processor to:

identify a vehicle and/or electric machine frequency response during operation of the vehicle including collecting measured noise and vibration sensor data using at least one on-board sensor in the vehicle;

wherein the at least one on-board sensor in the vehicle is a microphone for Bluetooth communication by a vehicle occupant, a microphone for wireless communication by the vehicle occupant, a microphone for use by the vehicle occupant with an entertainment system, a microphone for use by the vehicle occupant with a navigation system, or an accelerometer for crash detection; and use the electric machine and a dynamic motor drive converter to choose a dynamic motor drive pulsing frequency based in part on the identified frequency response.

2. The electric machine controller of claim 1, wherein the dynamic motor drive converter is an inverter and outputs current waveforms with excitation frequencies based on the identified frequency response.

3. The electric machine controller of claim 2, wherein the output current waveforms with excitation frequencies are in the form of one of: steady state, random, periodic, or transient.

4. The electric machine controller of claim 1, wherein identifying the vehicle and/or electric machine frequency response during operation of the vehicle includes collecting measured noise and vibration sensor data using at least one on-board sensor in the vehicle and processing the sensor data to calculate frequency response functions due to a source excitation.

5. The electric machine controller of claim 4, wherein the instructions execute to detect peaks in the calculated frequency response functions to identify resonances or to compare the frequency response against a calibratable threshold to determine peaks that are of a magnitude that need to be mitigated.

6. The electric machine controller of claim 5, wherein the instructions execute to change the dynamic motor drive pulsing frequency if it is determined that the peaks are of a magnitude that need to be mitigated.

7. An electric machine controller in a vehicle, wherein the electric machine controller has a processor and memory and instructions that are stored in the memory and executable by the processor to:

calibrate frequency selection or avoidance tables;

wherein the calibration includes scaling at least one measured frequency response function for torque based on an ideal dynamic motor drive pulse height;

estimate a number of noise, vibration, harshness (NVH) levels using on-board sensors at different locations on the vehicle for different pulsing frequencies and different levels of motor torque;

wherein the at least one of the on-board sensors is a microphone for Bluetooth communication by a vehicle occupant, a microphone for wireless communication by the vehicle occupant, a microphone for use by the vehicle occupant with an entertainment system, a microphone for use by the vehicle occupant with a navigation system, or an accelerometer for crash detection;

compare the estimated NVH levels against at least one calibratable threshold for each different location;

determine which estimated NVH levels meet or exceed a threshold; and assuming that pulsing at lower frequencies is more efficient for dynamic motor drive operation, select a frequency of electric machine pulsing that is acceptable for NVH.

8. The electric machine controller of claim 7, wherein assuming that pulsing at lower frequencies is more efficient for dynamic motor drive operation, select a lowest frequency of electric machine pulsing that is acceptable for NVH.

9. The electric machine controller of claim 7, wherein selecting a frequency of electric machine pulsing that is acceptable for NVH includes combining the selection results with an efficiency table as a function of pulsing frequency and wherein a most efficient frequency that is acceptable for NVH is selected.

10. The electric machine controller of claim 7, wherein scaling at least one measured frequency response function for torque based on an ideal dynamic motor drive pulse height is accomplished by time domain convolution.

11. The electric machine controller of claim 7, wherein scaling at least one measured frequency response function for torque based on an ideal dynamic motor drive pulse height is accomplished by a frequency domain multiplication of one of the measured frequency response functions with a frequency domain representation of a waveform with an intended pulsing frequency for different torque levels.

12. An electric machine controller in a vehicle, wherein the electric machine controller has a processor and memory and instructions that are stored in the memory and executable by the processor to:

monitor operational NVH responses after initial calibration wherein initial calibration includes:

calibrating frequency selection or avoidance tables; wherein the calibration includes scaling at least one measured frequency response function for torque based on an ideal dynamic motor drive pulse height;

measure NVH operational responses using at least one on-board sensor in the vehicle comprising a microphone for Bluetooth communication by a vehicle occupant, a microphone for wireless communication by the vehicle occupant, a microphone for use by the vehicle occupant with an entertainment system, a microphone for use by the vehicle occupant with a navigation system, or an accelerometer for crash detection along with one or more dynamic motor drive or electric motor parameters; and adjust a frequency selection calibration based on the measured NVH operational response at different speeds or torque loads.

13. The electric machine controller of claim 12, wherein the instructions execute to continue to monitor long term NVH evolution for diagnostic data collection purposes and wherein the diagnostic data is stored in memory.

14. The electric machine controller of claim 12, wherein the one or more dynamic motor drive or electric motor parameters is selected from the group of parameters including:

torque, pulsing frequency, high level of pulsing, low level of pulsing, motor speed, and vehicle speed.

15. The electric machine controller of claim 12, wherein a waveform cycle varies as a function of a rotational speed of the electric machine.

16. The electric machine controller of claim 12, wherein a first level output is torque level at which the motor is most efficient at its given rotational speed and a second output level is 0 percent torque.

17. The electric machine controller of claim 12, wherein during the pulsed operation of the electric machine, the electric machine is turned off for at least portions of the times that the electric machine outputs zero torque.

18. The electric machine controller of claim 12, wherein a period between beginnings of sequential first output level pulses is a waveform cycle and the waveform cycle varies during operation of the electric machine.

* * * * *